United States Patent
Ogawa

(10) Patent No.: US 7,426,038 B2
(45) Date of Patent: Sep. 16, 2008

(54) DETECTION DEVICE, OPTICAL PATH LENGTH MEASUREMENT DEVICE, MEASUREMENT INSTRUMENT, OPTICAL MEMBER EVALUATION METHOD, AND TEMPERATURE CHANGE DETECTION METHOD

(75) Inventor: Kensuke Ogawa, Tokyo (JP)

(73) Assignee: Fujikura Ltd., Tokyo (JP)

( * ) Notice: Subject to any disclaimer, the term of this patent is extended or adjusted under 35 U.S.C. 154(b) by 377 days.

(21) Appl. No.: 10/542,204

(22) PCT Filed: Aug. 6, 2004

(86) PCT No.: PCT/JP2004/011367

§ 371 (c)(1), (2), (4) Date: Jul. 14, 2005

(87) PCT Pub. No.: WO2005/015149

PCT Pub. Date: Feb. 17, 2005

(65) Prior Publication Data

US 2006/0132793 A1 Jun. 22, 2006

(30) Foreign Application Priority Data

Aug. 12, 2003 (JP) ............................. 2003-292656
Dec. 12, 2003 (JP) ............................. 2003-415294

(51) Int. Cl.
G01B 9/02 (2006.01)
(52) U.S. Cl. ..................................... 356/484; 356/521
(58) Field of Classification Search ................. 356/482, 356/484–487, 477, 511–514

See application file for complete search history.

(56) References Cited

U.S. PATENT DOCUMENTS

| 7,009,710 B2 * | 3/2006 | Sullivan et al. ............. 356/487 |
| 7,126,695 B2 * | 10/2006 | Tansey ........................ 356/486 |
| 2002/0101593 A1 * | 8/2002 | Yang et al. ................... 356/484 |

FOREIGN PATENT DOCUMENTS

| JP | S61-247901 A | 11/1986 |
| JP | S62-063833 A | 3/1987 |
| JP | H10-019508 A | 1/1998 |

* cited by examiner

Primary Examiner—Tarifur R Chowdhury
Assistant Examiner—Jonathan M Hansen
(74) Attorney, Agent, or Firm—Sughrue Mion, PLLC

(57) ABSTRACT

An object of the invention is to provide a detection apparatus, an optical path length measuring apparatus, a method for evaluating an optical member, and the like, which can evaluate optical characteristics such as chromatic dispersion and an optical path length at a high speed. Another object is to provide a detection apparatus and a method for detecting a change in temperature, which can evaluate chemical and biological reactions and an effect of hyperthermia with high accuracy. In a detection apparatus 10A, zero-order light B0 undergoing chromatic dispersion of a measurement object S is superimposed on first-order light B1 shifted in frequency, whereby a low-frequency beat is produced, and wavelength dependence of a beat phase thereof is measured. Moreover, using an AC electric signal from a frequency shifter 12 as a phase reference signal, a relative position of a probe signal is detected. In addition, it is effective to shift the frequencies of probe light and reference light having mutually different wavelengths and determine a beat phase of probe light in a relative manner on the basis of a beat phase of reference light.

27 Claims, 20 Drawing Sheets

Sa (S)

Sb (S)

Sc (S)

DETECTION DEVICE, OPTICAL PATH LENGTH MEASUREMENT DEVICE, MEASUREMENT INSTRUMENT, OPTICAL MEMBER EVALUATION METHOD, AND TEMPERATURE CHANGE DETECTION METHOD

TECHNICAL FIELD

The present invention relates to a detection apparatus, a method for evaluating an optical member, a method for detecting a change in temperature, and the like, which are suitable for evaluating an optical element and an optical member and for detecting and evaluating heat generation associated with a chemical reaction, a biological reaction and an effect of hyperthermia.

BACKGROUND ART

For evaluating and examining various kinds of optical elements and optical parts (hereinafter referred to collectively as optical members) such as optical fibers, various kinds of devices and photonic crystals for use in optical fiber communication which has been coming into wide use in recent years, chromatic dispersion in the optical member is measured.

For evaluation of chromatic dispersion, there have been methods described below. First, there is a method using a time-domain interferometer. In this method an interference waveform on a time-domain is measured using the time-domain interferometer, and the interference waveform is subjected to Fourier transformation, whereby the intensity and phase of a transmission spectrum or reflection spectrum of a measurement object are determined to obtain chromatic dispersion (see Non-Patent Document 1). For this purpose, in order to obtain an interference waveform on the time-domain, an optical delay stage placed in one path of the interferometer is swept back and forth with respect to an optical path, and the intensity of light emitted from the interferometer is measured as a function of delay time obtained from the sweep.

As another method for evaluating chromatic dispersion, a method of measuring an interference waveform on a spectrum axis using a spectrum interferometer is carried out (see Non-Patent Document 2). In this method, light emitted from the interferometer is spectrally resolved through a diffraction grating or spectrometer, interference fringes are measured as a function of a wavelength or frequency, and waveform dispersion is determined from dependency of a spectral phase on the wavelength (or frequency).

Another method is one in which using phase-modulated light, a phase shift associated with optical fiber propagation is directly measured by an electronic measuring instrument such as a network analyzer to determine chromatic dispersion (see Patent Document 1). In addition, there is a method for determining chromatic dispersion using a mode-locked pulse light source (see Patent Document 2). In this method, attention is focused on a specific longitudinal mode, and the phase delay of the longitudinal mode is measured to determine chromatic dispersion.

For detecting a chemical reaction, a biological reaction, an effect of hyperthermia and the like, heat generation associated with the reactions and effect of hyperthermia may be detected. For this purpose, there has been means for detecting a change in refractive index associated with a change in temperature in addition to thermocouples directly detecting a change in temperature. Methods for evaluating a change in refractive index associated with temperature include a method using a thermal lens effect (Non-Patent Document 3). In this method, monitor light is made to collectively enter a sample, and a change in collecting power by a change in temperature is detected as a change in intensity.

Non-Patent Document 1: Kazunori Naganuma, "Laser Research", Vol. 23, No. 11, 1995, Laser Society Association, pp. 55-66.

Non-Patent Document 2: A. P. Kovacs et al. "Group-delay measurement on laser mirrors by spectrally resolved white-light interferometry" Optics Letters, April 1995, Vol. 20, No. 7, pp. 788-790.

Patent Document 1: Japanese Patent No. 3278129

Patent Document 2: Japanese Patent Laid-Open No. 7-248276

Non-Patent Document 3: M. Terazima et al. "Photothermal investigation of the triplet state of carbon molecule (C60)" Journal of Physical Chemistry 1991 Vol. 95, pp. 9080-9085

DISCLOSURE OF THE INVENTION

Problems to be Solved by the Invention

With an increase in speed of optical fiber communication described above, influences by chromatic dispersion have become increasingly significant, and chromatic dispersion is now an important item in realization of ultra-high-speed optical fiber communication. Generally, optical elements and optical parts change their temperature every moment, and chromatic dispersion changes every moment in response to the change in temperature. In the conventional method using a time-domain interferometer or spectrum interferometer, a vibration in optical intensity is measured as a function of time or a wavelength, and a phase should be calculated from interference fringes obtained by the measurement, thus requiring additional time for data processing. Therefore, it is difficult to speedily evaluate chromatic dispersion changing every moment by the conventional method. In addition, the conventional method has a problem such that evaluation results are not intuitively recognizable. Further, a chromatic dispersion evaluating apparatus using a time-domain interferometer requires an optical delay stage to be driven for measuring interference fringes. In the case of large dispersion, the delay stage should be driven over a broad time domain, and much time is required for sweeping, thus making it difficult to make measurements at a high speed. Furthermore, an interference waveform on a time-domain should be subjected to Fourier transformation to determine a phase, and thus much time is required for analysis of data. The same holds true for the spectrum interferometer in the sense that it is difficult to make measurements at a high speed.

The method for measuring chromatic dispersion in which phase-modulated light is used, and the light is directly measured by an electronic measuring instrument, and the method using a mode-locked light source are capable of evaluating chromatic dispersion of long-distance optical fibers having a length of 1 km or greater, but are not suitable for accurately measuring chromatic dispersion of an optical element or the like of which the length is less than 1 cm.

In recent years, techniques such as wavelength multiplexing transmission having high transmission efficiency have been developed as optical fibers have come into wide use, and techniques capable of accurately measuring not just chromatic dispersion but various optical characteristics such as the optical path length in optical fibers and various kinds of optical devices are required. In wavelength multiplexing transmission and the like, a large number of channels divided by the wavelength are handled, and therefore it is required to develop an element having a large number of optical waveguides integrated on a same chip. For dealing with the problem, a device technique using a micro-optical circuit such as a photonic crystal optical waveguide is under consideration. In the micro-optical circuit, losses associated with input to and output from external fibers and light propagation in an optical path itself may increase, and reduction of the losses is a challenge in technical development. Accordingly, it is required to measure and evaluate an element with a large optical loss in a stage of development of a micro-optical path.

In measurement of a refractive index using a thermal lens effect for detecting heat generation associated with a chemical reaction, a biological reaction, an effect of hyperthermia and the like, light must be made to collectively enter a sample. Therefore, heat generation by light for monitoring is no longer negligible, and thus it is difficult to correctly evaluate chemical and biological reactions and the effect of hyperthermia.

The present invention has been made based on such technical problems, and its object is to provide a detection apparatus, an optical path length measuring apparatus, a method for evaluating an optical member, and the like, which are capable of speedily evaluating optical characteristics such as chromatic dispersion and an optical path length. Another object is to provide a detection apparatus and a method for detecting a change in temperature, which are capable of accurately evaluating chemical and biological reactions and an effect of hyperthermia.

Means for Solving the Problems

In the present invention, under such objects, chromatic dispersion is determined essentially from wavelength (or frequency) dependence of a phase, and therefore an interferometer producing a beat (corrugation) is built for directly measuring a phase. For monitoring a change in phase at a high speed, phase fluctuations should be removed to improve phase detection accuracy. For this purpose, a two-wavelength light source may be used wherein a beat signal produced at one wavelength is a reference signal for phase reference and a beat signal produced at the other wavelength is a probe signal for measurement of a phase. In this case, reference light is separated from probe light according to a difference in wavelength after passage through an interferometer, and chromatic dispersion is obtained as a phase change of probe light relative to reference light.

A detection apparatus of the present invention made from this point of view emits probe light having a first wavelength and reference light having a second wavelength different from the first wavelength from a light source. By a frequency shifter driven by an AC electric signal source, the probe light is branched into first probe light and second probe light, and the reference light is branched into first reference light and second reference light, and the frequencies of the first probe light and the first reference light, or the frequencies of the second probe light and the second reference light are shifted. Further, a measurement object is irradiated with first probe light and first reference light by an irradiation unit, and then first probe light and first reference light are superimposed on second probe light and second reference light not applied to the measurement object by a superimposition unit. Superimposition of first probe light and second probe light produces a beat in probe light. Similarly, a beat in reference light is produced between first reference light and second reference light. The amount of frequency shift is a non-zero integral multiple of an AC electric signal from the AC electric signal source driving the frequency shifter. If first-order light is used, the integer value equals 1. The amount of frequency shift equals a frequency of a beat produced in each of probe light and reference light. The phase of the beat of probe light includes a phase shift associated with application to the measurement object. If a source in a radio frequency (RF) band of, for example, 30 to 200 MHz, more specifically about 100 MHz is used as the AC electric signal source, a produced beat is also in an RF band. Such a beat has a considerably low frequency compared to original probe light and reference light, and can be detected using an electronic measuring instrument such as a lock-in amplifier. The frequency of the AC electric signal is selected so that efficiency of generation of second light is improved. For a frequency shifter using acousto-optic crystals, the beat is usually in the range of about 10 to 200 MHz. It is effective in prevention of a reduction in intensity of a beat signal due to an optical loss by the measurement object and avoidance of an increase in noise to adjust a power of an AC electric signal applied to the frequency shifter and control a distribution ratio between first probe light and first reference light of which the frequencies are shifted by the frequency shifter, and a distribution ratio between second probe light and second reference light by a distribution ratio controlling unit.

A chromatic dispersion measuring unit measuring chromatic dispersion of the measurement object based on the phase of a beat detected by a phase detecting unit can be further provided. This chromatic dispersion measuring unit may be integral with the detection apparatus, or may be provided separately from the detection apparatus if the chromatic dispersion measuring unit is constituted by a PC (personal computer) or the like. Chromatic dispersion by the measurement object can be obtained by detecting a phase of a beat of probe light as a function of a frequency or wavelength of probe light by the phase detecting unit in this way. At this time, the phase is relatively detected on the basis of a beat of reference light produced by superimposition of first reference light and second reference light by the superimposition unit, thus making it possible to eliminate phase fluctuations resulting from external influences such as vibrations.

Furthermore, a change in temperature of the measurement object can be detected based on a phase change of a beat detected by the phase detecting unit. In this case, a unit detecting a change in temperature of the measurement object based on a phase change of a beat may be integral with the detection apparatus, but may be provided separately from the detection apparatus if the unit is constituted by a PC or the like.

If the light source emits probe light having a first wavelength and reference light having a second wavelength different from the first wavelength, so called a two-wavelength light source in which two-wavelength light is emitted from one light source can be used. Or the light source emitting probe light may be provided separately from the light source emitting reference light. The phase detecting unit may comprise a first photodetector converting a change in optical intensity of probe light into a change in electric signal, a second photodetector converting a change in optical intensity of reference light into a change in electric signal, and a lock-in amplifier detecting a relative change in phase of an electric signal output from the first photodetector based on an electric signal output from the second photodetector. The absolute value of an amplitude of the electric signal output from the first photodetector can also be detected by the lock-in amplifier. With this absolute value, a transmission or reflection spectrum of the measurement object can also be measured.

If probe light having a first wavelength and reference light having a second wavelength are used as described above, probe light and reference light should be branched according to the wavelength in the phase detecting unit. A wavelength selecting unit for separating a beat produced by superimposition of first probe light and second probe light from a beat produced by superimposition of first reference light and second reference light by a difference in wavelength between probe light and reference light is preferably provided before the phase detecting unit.

For the wavelength selecting unit, those described below can be considered. First, a wavelength selecting unit having a first filter allowing light having a first wavelength to pass therethrough, and a second filter allowing light having a second wavelength to pass therethrough can be used. In this way, probe light having a first wavelength and reference light having a second wavelength can be branched. By using a wavelength selecting unit having a filter allowing light having a first wavelength to pass therethrough and reflecting light having a second wavelength, probe light having a first wavelength and reference light having a second wavelength can be branched. This configuration can be realized by connecting components by optical fibers.

If the wavelength selecting unit is a free space system using an optical element, a wavelength selecting unit comprising a diffraction grating diffracting, at a predetermined angle matching a wavelength, first probe light and first reference light and second probe light and second reference light superimposed by the superimposition unit can be used. In this case, the wavelength selecting unit may further comprise a first lens forming into parallel beams superimposed light of first probe light and second probe light and superimposed light of first reference light and second reference light diffracted by the diffracting grating, a first optical element taking out superimposed light of first reference light and second reference light passing through the first lens, a second lens provided in parallel with the first lens, and refracting superimposed light of first probe light and second probe light passing through the first lens, a second diffraction grating diffracting superimposed light of first probe light and second probe light refracted by the second lens at a predetermined angle matching a wavelength, and a second optical element taking out superimposed light of first probe light and second probe light diffracted by the second diffraction grating. In an optical system of the wavelength selecting unit having this configuration, even if a diffraction angle at the diffraction grating changes as the wavelength of probe light changes when the wavelength of probe light is variable, an angle and a position of emission from the second diffraction grating can be fixed, thus making it possible to easily take out probe light.

The phase detecting unit comprises a first photoelectric element converting energy of superimposed light of first probe light and second probe light into an electric signal and outputting the same, and a second photoelectric element converting energy of superimposed light of first reference light and second reference light, wherein a phase can be detected based on an electric signal output from the first photoelectric element and an electric signal output from the second photoelectric element. Photodiodes can be used as the first photoelectric element and the second photoelectric element. If at least the photodiode constituting the second photoelectric element is of the AC matching type, direct-current components on the reference light side can be removed, and thus accurate measurements on the basis of reference light can be made.

When the measurement object reflects only light in a specific wavelength range, the wavelength of first probe light is set to be within the wavelength range, and the wavelength of first reference light is set to be outside the wavelength range, first reference light is not reflected at the measurement object, and therefore measurements cannot be made. Thus, the irradiation unit preferably comprises a reflection material reflecting first reference light before or after the measurement object in a direction in which the measurement object is irradiated with first probe light and first reference light. This reflection material preferably includes a wavelength of first reference light and reflects only light in a wavelength range different from that of the measurement object.

In the device for determining chromatic dispersion described above, high accuracy is required for the optical path length of a optical fiber propagation path in the device for accurate measurement. For measurement of the length of optical fibers, measurement of a physical length has not been preferable for correctly measuring the length because the measurement includes errors due to expansion and contraction of optical fibers themselves associated with a temperature change, and variations and errors in regard to the refractive index of optical fibers. In contrast, the detection apparatus of the present invention can measure the optical path length of the measurement object based on a phase change of a beat produced by superimposition of first probe light and second probe light, detected by the phase detecting unit.

This detection apparatus makes it possible to measure the optical path length of the optical propagation path for various applications in addition to the applications described above.

In the above description, a two-wavelength light source is used wherein a beat signal produced at single-wavelength is reference light for phase reference, a beat signal produced at the other wavelength is probe light for measurement of a phase, a phase change in probe light with respect to reference light is perceived in a relative manner, and chromatic dispersion is determined, but instead a beat may be produced at a single wavelength, and chromatic dispersion may be perceived based on the beat. In this case, light from a single mode wavelength light source is separated into zero-order light and first-order light by a frequency shifter. Zero-order light is allowed to pass the measurement object while first-order light is not allowed to pass the measurement object, the former is superimposed on the latter to produce a beat, and a phase of the beat is measured as a function of a wavelength on the basis of the phase of an AC electric signal supplied to the frequency shifter to obtain chromatic dispersion.

In the detection apparatus of the present invention made from this point of view, first light having a predetermined wavelength and a predetermined frequency and second light having a frequency shifted with respect to first light are supplied by a light supplying unit. The measurement object is irradiated with one of first light and second light by the irradiation unit. One of first light and second light applied to the measurement object by the irradiation unit is superimposed on the other one of first light and second light not applied to the measurement object by the superimposition unit. As a result, a beat is produced by superimposition of first light and second light, and thus a difference in optical frequency is generated for first light and second light to detect a phase of the beat by the phase detecting unit on the basis of a phase of an AC electric signal being a source of the beat. The light supplying unit may comprise a light source radiating light at a single frequency, and a frequency shifter branching part of light radiated from the light source and inputting the branched part of light to acousto-optic crystals to shift the frequency thereof, wherein the phase detecting unit detects a phase of a beat produced superimposition of first light and second light by the superimposition unit using an AC electric signal input to acousto-optic crystals for shifting the frequency of the part of light. In this way, an AC electric signal for shifting the frequency of the part of light is used, and an electric signal having a frequency equal to that of the AC electric signal and having a stabilized phase is used as a reference, whereby a phase of a produced beat can be detected. A distribution ratio controlling unit adjusts a power of an AC electric signal applied to the frequency shifter and controls a distribution ratio between first light and second light of which the frequencies are shifted by the frequency shifter. This is effective in preventing a reduction in intensity of a beat signal due to an optical loss by the measurement object and avoiding an increase in noise.

This detection apparatus may further comprise a chromatic dispersion measuring unit measuring chromatic dispersion of the measurement object based on a phase of a beat detected by the phase detecting unit. A change in temperature of the measurement object can be detected based on a change in phase of a beat detected by the phase detecting unit. If a change in temperature is detected, a change in temperature of the measurement object can be evaluated by measuring a phase as a function of a wavelength or frequency of first probe light to determine a refractive index of a detection object, and measuring temperature dependence of the refractive index. Even in this single-wavelength system detection apparatus, the optical path length of the measurement object can be measured based on a change in phase of a beat produced by superimposition of first light and second light, detected by the phase detecting unit.

The detection apparatus described above can be used for evaluation, examination and the like of various kinds of optical members if the measurement object is an optical member. If the measurement object is a chemical agent, biological material or cell, heat generation by a chemical reaction, biological reaction, a change in structure of an organism or heat generation by irradiating an organism with an electromagnetic wave can be evaluated as a temperature change in refractive index. A glass cell loaded with a chemical agent or an aqueous solution with cells mixed therein is used for the measurement object to measure heat generation by mixture of the chemical agent or an increase in temperature of cells associated with irradiation with an electromagnetic wave. In this way, a chemical reaction, biological reaction or the like can be detected, and an effect of hyperthermia on cancer cells can be evaluated. In the detection apparatus having such a configuration, light can be made to enter the measurement object as parallel beams, and therefore an increase in temperature by irradiation with light is negligible. A change in refractive index can be captured at a high speed, thus making it possible to monitor a reaction process and a heat process in real time.

In the single-wavelength system and two-wavelength system detection apparatuses described above, a space between components may be a free optical system in which light is propagated by an optical element such as a mirror, or may be a system in which light is propagated by optical fibers. If optical fibers are used, polarization maintaining optical fibers are preferably used. For a light source emitting probe light and reference light, especially for a light source emitting probe light, the frequency or wavelength is preferably variable. Consequently, the frequency or wavelength can be set to optimum one according to the measurement object.

The detection apparatus of the present invention may be characterized by comprising:
a light source emitting probe light having a first wavelength and reference light having a second wavelength different from the first wavelength;
a frequency shifter branching light emitted from the light source into light having a first frequency and light having a second frequency;
an irradiation unit irradiating a measurement object with light having a first frequency, branched by the frequency shifter;
a photocoupler superimposing light having a first frequency, passing through the irradiation unit, on light having a second frequency;
a filter branching light passing through the photocoupler into light having a first wavelength and light having a second wavelength;
a first photodiode outputting an electric signal matching light having a first wavelength, branched by the filter;
a second photodiode outputting an electric signal matching light having a second wavelength, branched by the filter; and
a lock-in amplifier measuring a change in electric signal output from the first photodiode based on the electric signal output from the second photodiode. The second photodiode is preferably of the AC matching type capable of removing direct-current components in terms of accuracy and stability. The detection apparatus may further comprise a result outputting unit outputting a measurement result as visual information based on the electric signal output from the lock-in amplifier, and the result outputting unit may comprise an oscilloscope which can display the electric signal in an X-Y mode.

The present invention may be considered as an optical path length measuring apparatus characterized by comprising:
a light source emitting probe light having a first wavelength and reference light having a second wavelength different from the first wavelength;
a frequency shifter branching probe light into first probe light and second probe light, and reference light into first reference light and second reference light, and shifting the frequencies of first probe light and first reference light or the frequencies of second probe light and second reference light;
an irradiation unit irradiating a measurement object with first probe light and first reference light;
a superimposition unit superimposing first probe light and first reference light applied to the measurement object by the irradiation unit on second probe light and second reference light; and
a phase detecting unit detecting a phase of a beat produced by superimposition of first probe light and second probe light by the superimposition unit on the basis of a beat produced by superimposition of first reference light and second reference light,
wherein when a wavelength of probe light emitted from the light source is swept, a change in phase of a beat is detected by the phase detecting unit to measure an optical path length of the measurement object.

The present invention may be considered as a device for measurement which is used in a measurement apparatus irradiating a measurement object with probe light having a predetermined wavelength and reference light having a wavelength different from that of probe light, and measuring optical characteristics of the measurement object. The device for measurement is characterized in that the device for measurement can be used when the measurement object reflects light in a wavelength range including the wavelength of probe light and not including the wavelength of reference light, and the device for measurement is placed before or after the measurement object in a direction in which the measurement object is irradiated with probe light and reference light, reflects light in a wavelength range including the wavelength of reference light and being different from a wave length range of light reflected by the measurement object. This device for measurement can be constituted by an optical fiber grating connected to the rear side of the measurement object.

The present invention may be considered as a method for evaluating an optical member characterized by comprising the steps of:

producing first probe light having a first frequency, first reference light having a frequency different from the first frequency, second probe light having a frequency shifted from the first frequency by a predetermined amount, and second reference light having a frequency shifted from the second frequency by the above described predetermined amount;

irradiating the optical member with first probe light and first reference light;

superimposing first probe light and first reference light applied to the optical member on second probe light and second reference light;

detecting a phase of a beat produced by superimposition of first probe light on second probe light on the basis of a beat produced by superimposition of first reference light and second reference light; and measuring optical characteristics of the optical member based on the detected phase of the beat. In the step of measuring optical characteristics, chromatic dispersion of the optical member can be measured. When the wavelengths of first probe light and second probe light are swept, a change in phase of the beat is detected, whereby the optical path length of a measurement object can be measured.

The absolute value of an amount of frequency shift of second probe light and second reference light with respect to first probe light and first reference light is preferably smaller than the absolute value of a difference in frequency between first probe light and first reference light. For example, the absolute value of the amount of shift may be 30 to 200 MHz.

The present invention may be a method for evaluating an optical member characterized by comprising the steps of:

irradiating an optical member with one of first light having a predetermined wavelength and a predetermined frequency and second light having a frequency different from that of first light;

superimposing one of first light and second light applied to the optical member on the other one of first light and second light;

detecting a phase of a beat produced by superimposition of first light and second light based on an AC electric signal matching a difference in frequency between first light and second light; and measuring chromatic dispersion of a measurement object based on the above detected phase of the beat.

If the measurement object is a chemical agent, biological material or cell, the present invention may be a method for detecting a change in temperature characterized by comprising the steps of:

irradiating a detection object with one of first light having a predetermined wavelength and a predetermined frequency and second light having a frequency different from that of first light;

superimposing one of first light and second light applied to the detection object on the other one of first light and second light; and detecting a phase of a beat produced by superimposition of first light and second light to detect a change in temperature of the detection object.

The present invention may be a method for detecting a change in temperature characterized by comprising the steps of:

producing first probe light having a first frequency, first reference light having a second frequency different from the first frequency, second probe light having a frequency shifted from the first frequency by a predetermined amount, and second reference light having a frequency shifted from the second frequency by the above described predetermined amount;

irradiating the optical member with first probe light and first reference light;

superimposing first probe light and first reference light applied to the optical member on second probe light and second reference light;

detecting a phase of a beat produced by superimposition of first probe light and second probe light on the basis of a beat produced by superimposition of first reference light and second reference light; and detecting a change in temperature of a detection object based on the detected phase of the beat.

By detecting a change in temperature of a detection object in this way, a chemical reaction and a biological reaction of the detection object can be detected. If a change in temperature is detected, a change in temperature of a detection object can be evaluated by measuring a phase as a function of a wavelength or frequency of first probe light to determine a refractive index of the detection object, and measuring temperature dependence of the refractive index.

Effects of the Invention

According to the present invention, the frequency is shifted between light undergoing chromatic dispersion of a measurement object and light not undergoing chromatic dispersion of the measurement object to produce a beat at a frequency band allowing measurements to be made by an electronic measuring instrument and the like, and wavelength dependence of the phase of the beat is measured. As a result, chromatic dispersion, the optical path length and the like can be measured speedily and reliably. Measurement results can be output as information indicating wavelength dependence of the phase, thus making it possible to intuitively recognize measurement results. Two-wavelength light is shifted in frequency, respectively and used, and a signal for making a shift in frequency is used as a reference, whereby phase fluctuations can be eliminated to make measurements with high accuracy. Measurements of refractive indexes can be made for detecting heat generation associated with a chemical reaction, a biological reaction, effects of hyperthermia, and chemical and biological reactions and effects of hyperthermia can be evaluated correctly.

DESCRIPTION OF SYMBOLS 10A, 10B, 10C . . . detection apparatus,
11 . . . light source (light supplying unit),
12 . . . frequency shifter,
13 . . . measurement object setting unit (irradiation unit),
15 . . . beam coupler (superimposition unit),
16 . . . photodetector,
16A . . . photodetector (first photoelectric element, first photodiode),
16B . . . photodetector (second photoelectric element, second photodiode),
17 . . . lock-in amplifier (phase detecting unit),
18 . . . control/display unit (chromatic dispersion measuring unit, result outputting unit),
21 . . . cell,
22 . . . heating unit,
30 . . . distribution ratio controlling unit,
31 . . . light source,
32 . . . first light source,
33 . . . second light source,
36 . . . wavelength selecting unit,
37 . . . optical fiber branching unit,
38A . . . tunable filter (first filter),
38B . . . tunable filter (second filter),
38C . . . tunable filter (filter),
41 . . . light source,
50 . . . wavelength selecting unit,
51 . . . diffraction grating,
52 . . . diffraction grating (second diffraction grating),
53 . . . lens (first lens),
54 . . . lens (second lens),
56 . . . mirror (first optical element),
57 . . . mirror (second optical element),
80 . . . reflector (reflection material),
100 . . . oscilloscope,
B0 . . . zero-order light (first light),
B1 . . . first-order light (second light),
F . . . optical fibers,
S . . . measurement object (optical member, detection object),
Sa . . . optical device (optical member),
Sb . . . optical fibers (optical member),
Sc . . . optical fiber grating (optical member),
Z, $Z_0$, $Z_1$ . . . superimposed light,
$\lambda$ . . . wavelength,
$\lambda_0$ . . . wavelength (first wavelength), and
$\lambda_1$ . . . wavelength (second wavelength)

BEST MODE FOR CARRYING OUT THE INVENTION

The invention will be described in detail below based on embodiments shown in the attached drawings.

First Embodiment

Figure 1:
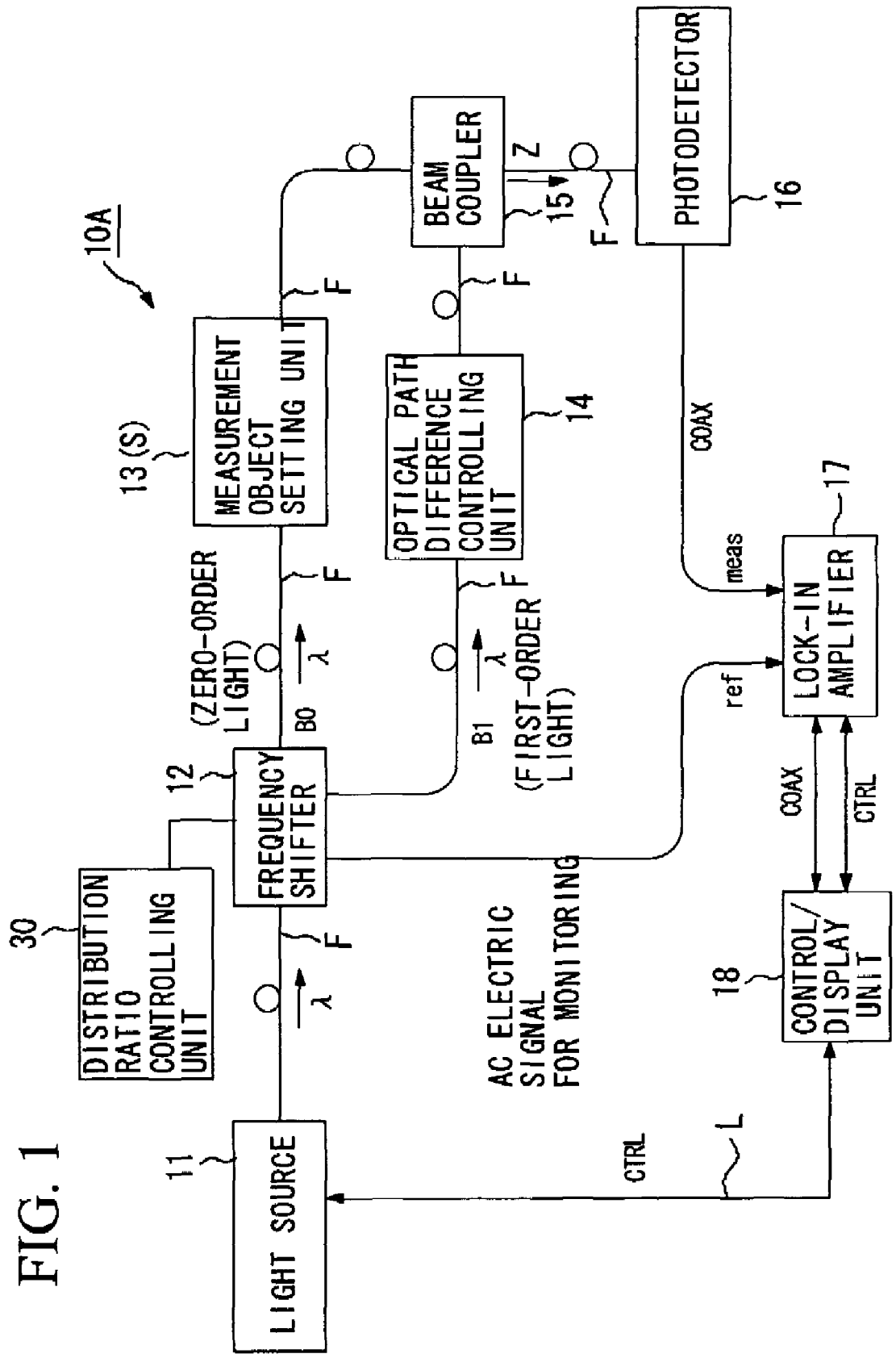
FIG. 1 shows the configuration of a detection apparatus in the first embodiment.

As shown in FIG. 1, in a detection apparatus 10A of single-wavelength beat phase detection system, probe light for measurement of chromatic dispersion is made to pass through a frequency shifter 12 composed of acousto-optic (AO) crystals having a predetermined AC electric signal applied thereto. Then, first-order light (second light) B1 diffracted by acousto-optic crystals is shifted by a frequency of the AC electric signal. Zero-order light (first light) B0 passing through the acousto-optic crystals has an original frequency. Zero-order light B0 is made to pass through a measurement object (optical member, detection object) S for chromatic dispersion. Then, zero-order light B0 undergoes a change in phase by chromatic dispersion of the measurement object S (frequency is unchanged). Thereafter, when zero-order light B0 is superimposed on first-order light B1 again, a beat by interference is produced. If wavelength dependence of a phase of a beat in superimposed light Z having the beat produced by superimposition of zero-order light on first-order light is measured, chromatic dispersion can be measured and evaluated. At this time, a frequency difference between zero-order light and first-order light is shifted by the frequency of the AC electric signal applied to acousto-optic crystals, and therefore superimposed light Z obtained by superimposition of zero-order light B0 on first-order light B1 equals the frequency of the AC electric signal and can be detected by an electronic measuring instrument. As a result, chromatic dispersion can be measured reliably.

In the case of the frequency shifter 12 using acousto-optic crystals, the intensity of first-order light B1 is proportional to the power of the AC electric signal applied to the frequency shifter 12, and the intensity of zero-order light B0 decreases accordingly. Therefore, by changing the power of the AC electric signal applied to the frequency shifter 12, a light intensity distributed to zero-order light B0 and first-order light B1 can be controlled. In the case of an existing device such as an optical fiber grating/arrayed waveguide grating, an optical attenuation after passage through the device, resulting from a loss when light is made to enter an optical circuit, a radiation loss associated with propagation through the optical circuit, a loss when light emitted from the optical circuit is taken out, and the like, is about 3 to 5 dB, or about 10 dB at maximum. In contrast to this, in the case of a micro-optical circuit such as photonic crystal waveguide, an attenuation of the light intensity may be as large as 30 dB due to the above described losses and the like. In this case, it is desirable that a higher power should be distributed to zero-order light B0 constituting a path on the side on which the measurement object S is set so that the intensity of a produced beat becomes maximum.

As shown in FIG. 1, the detection apparatus 10A comprises a light source (light supplying unit) 11, the frequency shifter 12, a measurement object setting unit (irradiation unit) 13, an optical path difference controlling unit 14, a beam coupler (superimposition unit) 15, a photodetector 16, a lock-in amplifier (phase detecting unit) 17, a control/display unit (chromatic dispersion measuring unit, result outputting unit) 18 and a distribution ratio controlling unit 30.

In this embodiment, paths through which light is propagated among the light source 11, the frequency shifter 12, the measurement object setting unit 13, the optical path difference controlling unit 14, the beam coupler 15 and the photodetector 16 are all composed of optical fibers F. As for optical fibers F, polarization-maintaining fibers (PMF) of single mode are used. Single mode characteristics are necessary for avoiding degradation in accuracy of chromatic dispersion measurement due to intermode dispersion. Polarization maintainability is necessary for evaluating dependency of the measurement object S on polarized light. In normal single mode fibers, different polarized light may coexist with a single polarized wave not maintained, thus making it difficult to screen polarized light.

The light source 11 is a tunable laser light source oscillating in a single mode (single wavelength). The spectral width of an oscillation line in the light source 11 is 1 GHz or less as a frequency, and the wavelength variable range is 1500 to 1600 nm. In FIG. 1, the peak wavelength of the oscillation line in the light source 11 is represented by $\lambda$. Probe light emitted from the light source 11 is introduced into the frequency shifter 12 through optical fibers F. The frequency shifter 12 is composed of acousto-optic crystals, and the frequency shifter 12 emits first-order light B1 shifted by a frequency equal to the frequency of the AC electric signal input to acousto-optic crystals, for example 80 MHz. Thus, non-shifted zero-order light B0 and first-order light B1 shifted in frequency are emitted from the frequency shifter 12. The frequency shifter 12 outputs an electric signal having a frequency equal to that of the AC electric signal input to acousto-optic crystals and having a stabilized phase to the lock-in amplifier 17 as a monitor signal for phase reference.

Zero-order light B0 emitted from the frequency shifter 12 enters the measurement object setting unit 13 through optical fibers F, and first-order light B1 enters the optical path difference controlling unit 14 through optical fibers F. Thereafter, zero-order B0 and first-order light B1 emitted from the measurement object setting unit 13 and the optical path difference controlling unit 14 are coupled together in the beam coupler 15. For the beam coupler 15, an optical fiber coupler may be used. At this time, zero-order light B0 undergoes a phase change by chromatic dispersion of the measurement object S through the measurement object S set in the measurement object setting unit 13. First-order light B1 does not undergo a phase change by the measurement object S. Thus, when zero-order light B0 and first-order light B1 are coupled together, interference occurs, and a beat signal of a difference frequency is produced. As a result, a phase equivalent to the phase change by the measurement object S is added to the phase of the beat signal. The frequency applied to acousto-optic crystals of the frequency shifter 12 is preferably sufficiently lower than the frequency of probe light. If the frequency of probe light is 150 to 400 THz, the frequency applied to acousto-optic crystals is preferably in a frequency band considerably lower than the frequency of probe light, for example in the RF band, or a band lower than the RF band, for example 30 to 200 MHz. Thus, the beat signal produced by coupling zero-order light B0 and first-order light B1 together has a frequency considerably lower than the frequency of probe light. In this case, zero-order light B0 and first-order light B1 may be considered to have substantially same wavelengths.

For zero-order light B0 and first-order light B1 emitted from the frequency shifter 12, the distribution ratio is controlled by the distribution ratio controlling unit 30. The distribution ratio controlling unit 30 adjusts the power of the AC electric signal input to acousto-optic crystals of the frequency shifter 12 so as to maximize the intensity of a beat produced by interference of zero-order light B0 undergoing a phase change by chromatic dispersion of the measurement object S and first-order light B1. If the measurement object S is limited to a specific object, the power of the AC electric signal is not made variable by the distribution ratio controlling unit 30 but may be fixed to a value set in advance and in such a case, the distribution ratio controlling unit 30 may be omitted.

The optical path difference controlling unit 14 is introduced for maximizing the intensity of a beat signal by interference of zero-order light B0 and first-order light B1. This is because the phase of laser beam is not always constant but fluctuates due to limitation of temporal coherence. For minimizing a reduction in intensity of the beat signal by the fluctuation, an optical path difference should be adjusted so that the propagation distance of zero-order light B0 equals that of first-order light B1. If the above propagation distances can be equalized by adjusting the length of each optical fiber F and the maximum intensity of the beat signal is obtainable, the optical path difference controlling unit 14 may be omitted.

Superimposed light Z of zero-order light B0 and first-order light B1 emitted from the measurement object setting unit 13 and the optical path difference controlling unit 14 and coupled together by the beam coupler 15 propagates through one optical fiber F and enters the photodetector 16. The photodetector 16 outputs an electric signal matching the intensity of incident light. At this time, incident light, i.e. superimposed light Z of zero-order light B0 and first-order light B1 has a beat, and therefore the electric signal output from the photodetector 16 has a beat matching the above beat.

In this way, the frequency shifter 12, the measurement object setting unit 13, the optical path difference controlling unit 14 and the beam coupler 15 constitute an interferometer by optical fiber connection. The interferometer is equivalent to a Mach-Zehnder interferometer, and the frequency shifter 12 functions as a type of beam splitter.

The lock-in amplifier 17 is used as a measuring instrument detecting a phase. For the response band of the lock-in amplifier 17, a band higher than the frequency of the beat signal should be selected. An electric signal from the photodetector 16 is determined to be a probe signal for measurement (hereinafter referred to as probe signal), an AC electric signal for monitoring from the frequency shifter 12 is determined to be a reference signal for phase reference (hereinafter referred to as phase reference signal), and each signal is input to the lock-in amplifier 17. Thus, in the lock-in amplifier 17, a phase of the probe signal relative to the phase of the phase reference signal can be detected. The relative phase of the probe signal corresponds to a phase change of zero-order light B0 by passage through the measurement object S. Therefore, by measuring a relative phase as a function of the wavelength of the light source 11, chromatic dispersion of the measurement object S can be determined. By measuring the absolute value of the intensity of the probe signal, a transmission or reflection spectrum of the measurement object S can be determined.

For measuring dependency of the relative phase on the wavelength, the relative phase should be obtained in synchronization with sweeping of the wavelength of the light source 11. For this purpose, the control/display unit 18 is provided as a chromatic dispersion measuring unit. The control/display unit 18 displays information allowing dependency of the relative phase on the wavelength, i.e. chromatic dispersion, to be visually recognized intuitively. For the configuration of the control/display unit 18, for example, an analog-digital converting unit enabling data to be input to a computer, an interface controlling devices, and a display are connected.

The control/display unit 18 and the light source 11 are connected by a device control line L. The device control line L is, for example, an interface conforming to IEEE 488 Standards and a cable thereof. The wavelength variable range/wavelength sweeping speed of the light source 11 is set and at the same time, the wavelength, the optical intensity and the like of light emitted from the light source 11 are monitored by the control/display unit 18. At the same time, the control/display unit 18 controls other measuring instruments such as the lock-in amplifier 17. Then, an input signal range and the like in the lock-in amplifier 17 can be monitored. For detection of a phase, there are two different cases: the case where a relative phase detected by the lock-in amplifier 17 is output as a voltage, and the case where a change in intensity for orthogonal two axes with a reference signal as a base is output as a voltage of two components of X-Y. In the former case, the phase is directly output, the output range is limited to a range of from $-\pi$ to $+\pi$ or from 0 to $2\pi$. If the range is exceeded, the signal turns back in a period of $2\pi$, and therefore the return-back should be canceled after measurement. In the latter case of X-Y output, the phase is not directly output, but a vibrating intensity signal is obtained, and the intensity signal is converted to obtain a relative phase. Any one of the two different output methods may be selected according to characteristics of the measurement object S.

Figure 2:
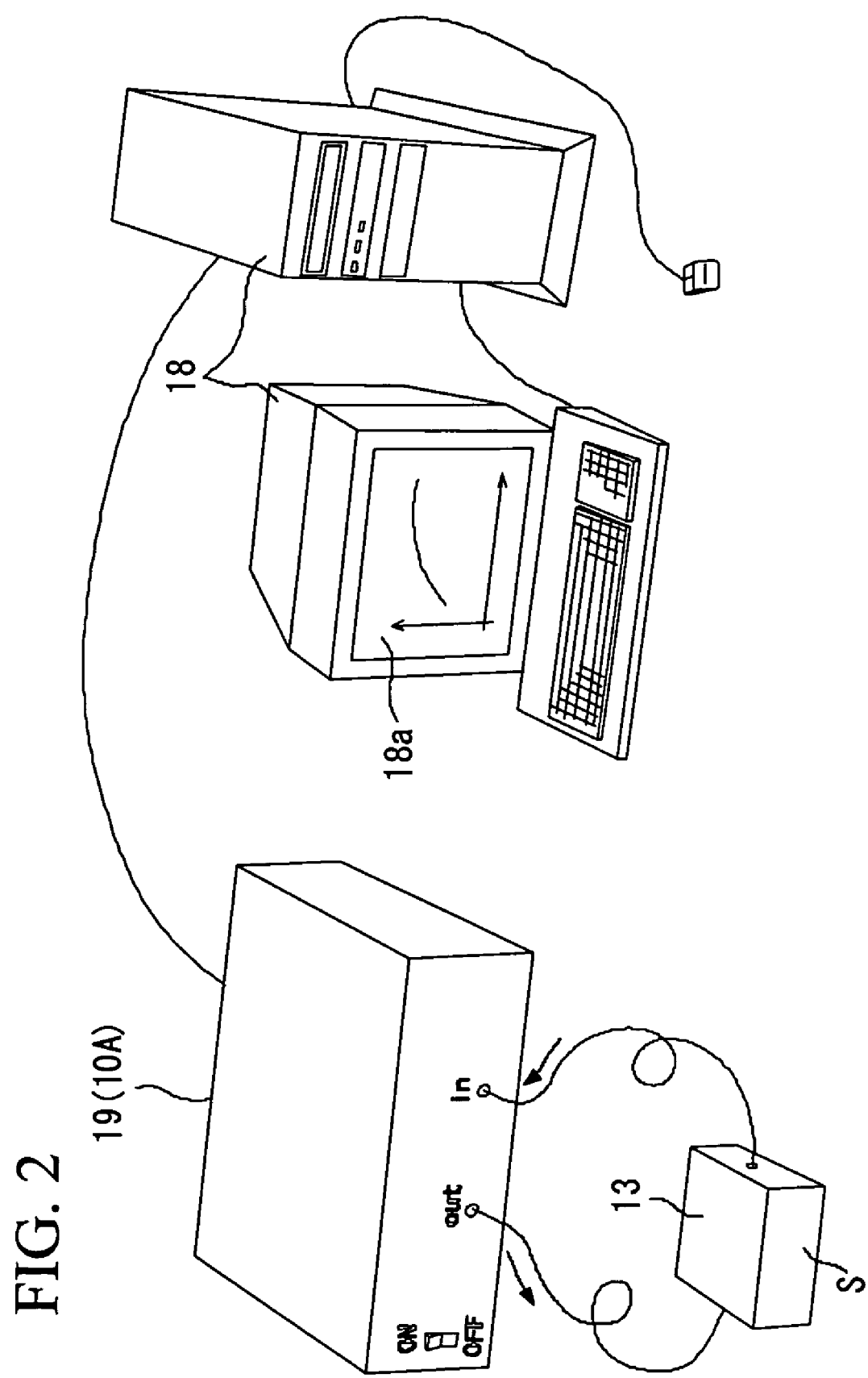
FIG. 2 shows one example of the external appearance of the detection apparatus.

In the detection apparatus 10A, the light source 11, the frequency shifter 12, the optical path difference controlling unit 14, the beam coupler 15, the photodetector 16, the lock-in amplifier 17 and the like are stored in a housing 19 as shown in FIG. 2. The control/display unit 18 may be provided in the housing 19, or may be constituted by a PC or the like as a separate component. In this case, a chromatic dispersion waveform is displayed on a display 18a of the PC as the control/display unit 18.

Figure 3:
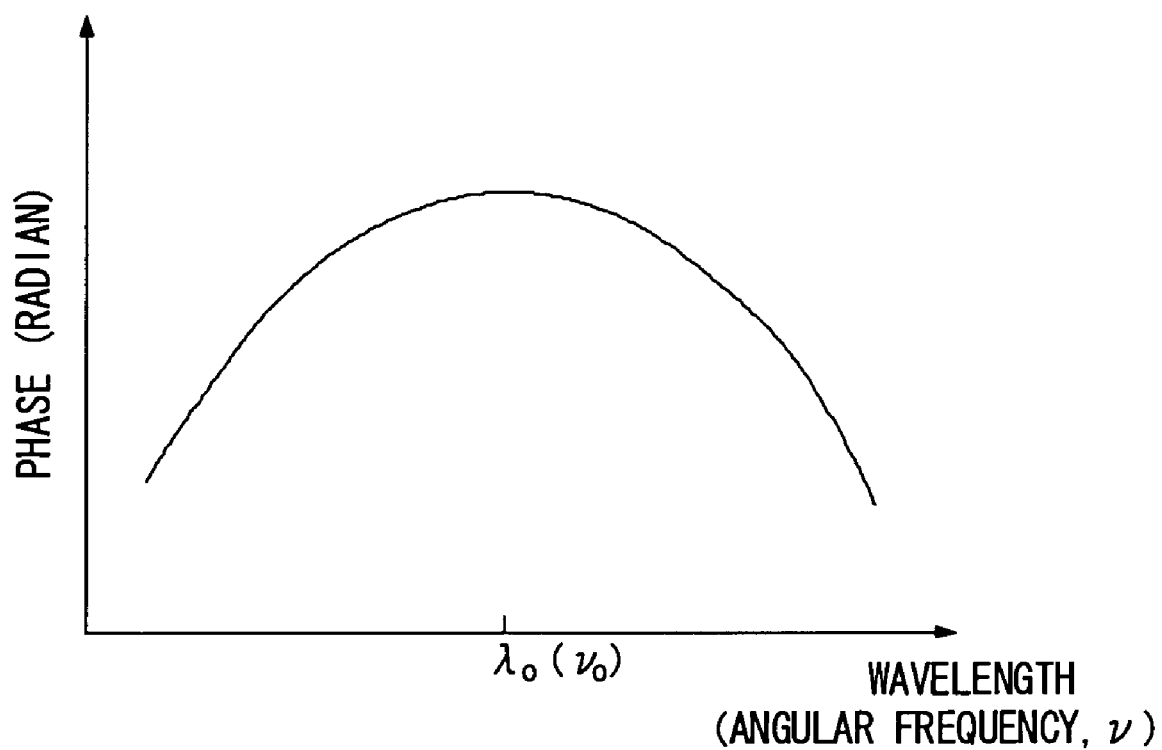
FIG. 3 shows an example of information indicating wavelength dependence of a phase output by the detection apparatus.

In the manner described above, chromatic dispersion of the measurement object Scan be measured. Measurement results can be displayed on the control/display unit 18 as a graph or the like showing dependency of the phase on the wavelength (frequency) in which the wavelength (frequency) is plotted along the horizontal axis and the phase is plotted along the vertical axis, as shown in FIG. 3. By comparing this result with a phase shown by power expansion with a frequency at the center, coefficients of each power, i.e. chromatic dispersion terms of each order are determined. In FIG. 3, a change reflecting second-order chromatic dispersion is shown.

As described above, in the detection apparatus 10A, zero-order light B0 undergoing chromatic dispersion of the measurement object S is superimposed on first-order light B1 shifted in frequency, whereby a beat of a low frequency is produced, and dependency of the beat phase on the wavelength (frequency) is measured. As a result, chromatic dispersion can be measured speedily and reliably. Furthermore, Measurement results can be output as information indicating dependency of the phase on the wavelength, thus making it possible to intuitively recognize the measurement results. Such a method like this does not limit the type and size of the measurement object S and leads to produce a highly universal apparatus.

Figure 4A:
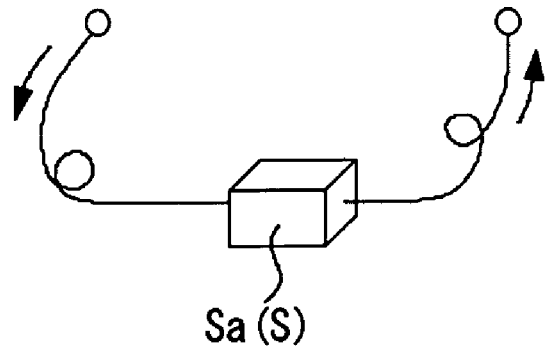
FIG. 4 shows a form of a measurement object set in the detection apparatus.
Figure 4B:
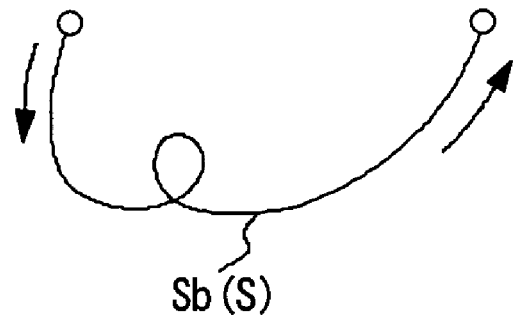
Figure 4C:
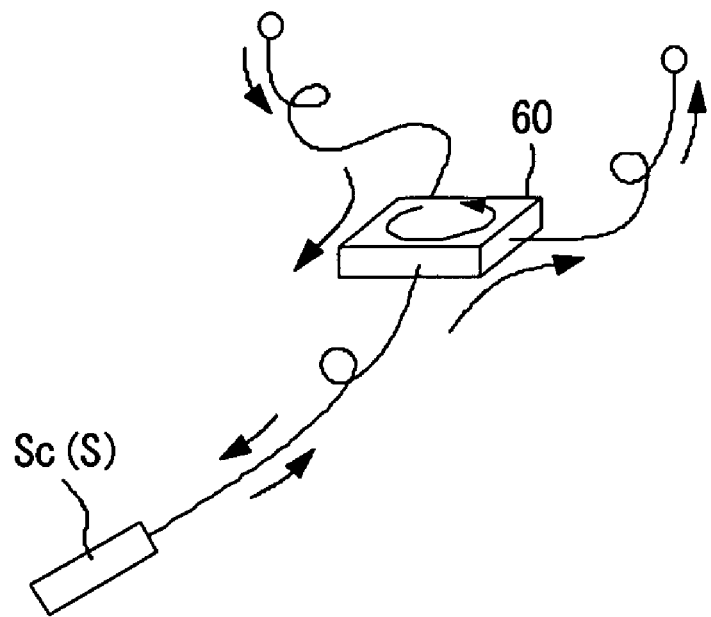
Figure 5:
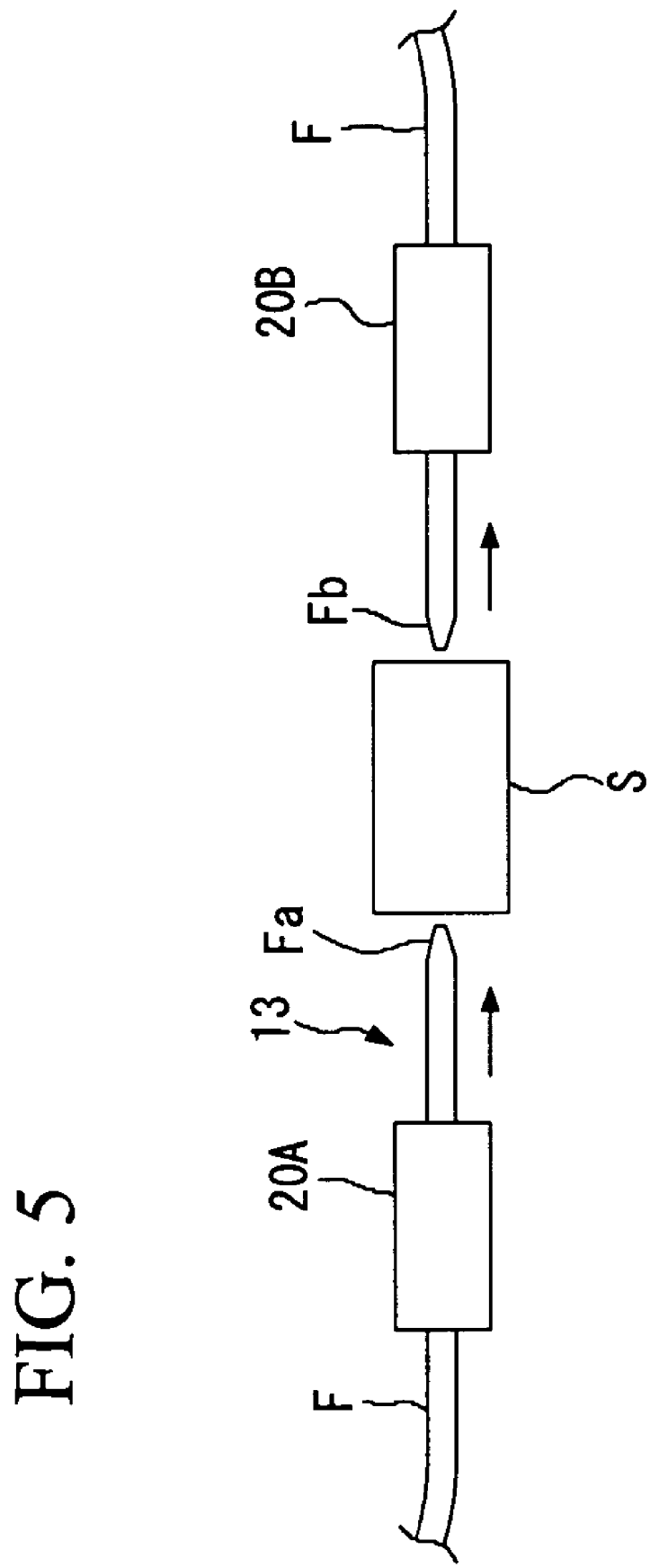
FIG. 5 shows another form of the measurement object set in the detection apparatus.

The detection device 10A can be used for evaluation and examination of various kinds of optical elements and optical members such as optical fibers, various kinds of devices and photonic crystals for use in optical fiber communication. In this case, as shown in FIG. 2, the measurement object setting unit 13 may be a module independent of the housing 19 for easily setting and exchanging the measurement object S. An optical device Sa, optical fibers Sb, an optical fiber grating Sc in refection-type arrangement, and the like being optical members are measurement objects S as shown in FIGS. 4A to 4C, these measurement objects S can be directly connected to an optical fiber connector (not shown) provided on the surface of the housing 19. If the optical fiber grating Sc is the measurement object S, a circulator 60 is used so as to capture light from the light incidence side and send light to the light emission side. If a normal optical waveguide, a photonic crystal waveguide, a waveguide-type semiconductor optical amplifier and the like are measurement objects S as shown in FIG. 5, the leading ends Fa and Fb of optical fibers F are made spherical on the light incidence side and light emission side in the measurement object setting unit 13. Optical fibers F on the light incidence side and light emission side are held by fiber holding units 20A and 20B, and fiber holding units 20A and 20B are each provided with a drive mechanism enabling linear movement along three axes orthogonal to one another and rotation around the axis.

Figure 6A:
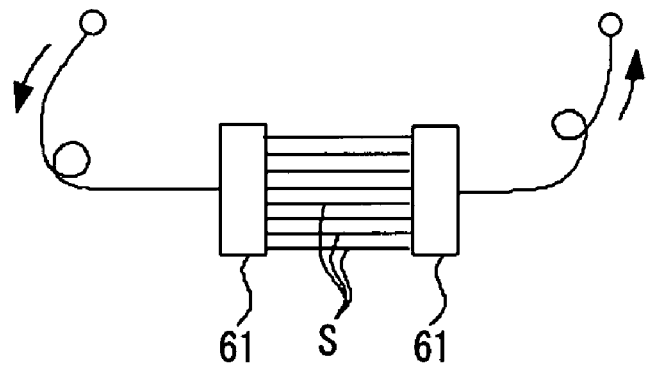
FIG. 6 shows still another form of the measurement object set in the detection apparatus.
Figure 6B:
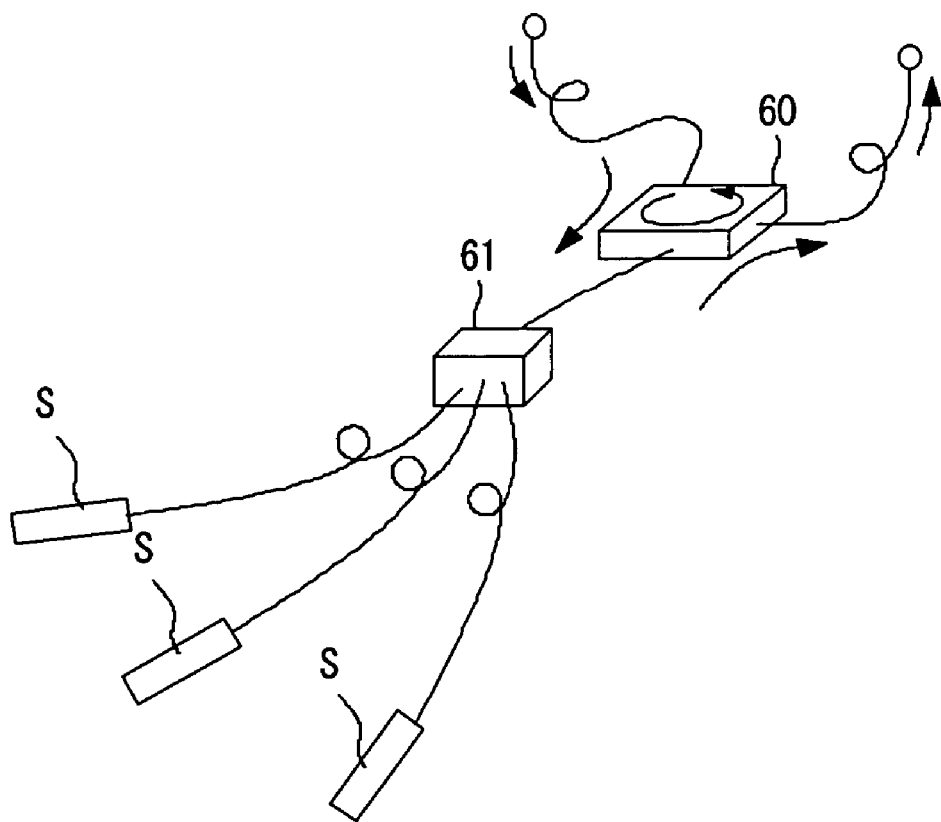

In addition, if a plurality of measurement objects S are measured as shown in FIGS. 6A and 6B, an optical switch 61 is preferably used. A plurality of measurement objects S are connected to the optical switch 61, switch of the optical switch 61 is controlled from the control/display unit 18 side, a plurality of measurement objects S to be irradiated with probe light and reference light switched one after another, and thus each measurement object S can be measured. This allows a plurality of measurement objects S to be continuously automatically measured.

Figure 7A:
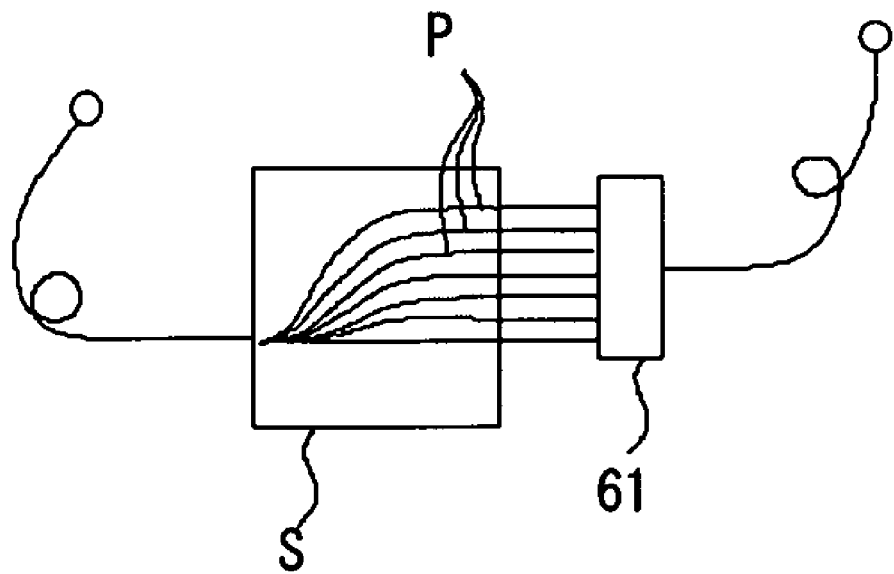
FIG. 7 shows still another form of the measurement object set in the detection apparatus.

As shown in FIG. 7A, the measurement object S having a plurality of passes p can be measured. Such measurement objects S include an AWG (Arrayed Waveguide Grating). AWG allows demultiplexing into a plurality of wavelengths and multiplexing from a plurality of wavelengths (e.g. see "16-ch Arrayed Waveguide Grating Module with 100-GHz Spacing" Tsunetoshi Saito, Toshihiko Ota, Tomoaki Toratani, Yoshimi Ono [online], [search: Dec. 2, 2003], Internet<URL:

http://www.furukawa.co.jp/review/fr019/fr19_09.pdf>.
"see 2:1 Arrayed-Waveguide Grating Based WDM Access Networks: An Evolutionary Multi-Gb/s Upgrade Path" Michael C. Parker, Stuart D. Walker [online], [search: Dec. 2, 2003], Internet<URL:

http://www.issls-council.org/proc00/papers/2_1.pdf>. If such a measurement object S is measured, the pass p of each channel can be measured by using the optical switch 61 in the same manner.

Figure 7B:
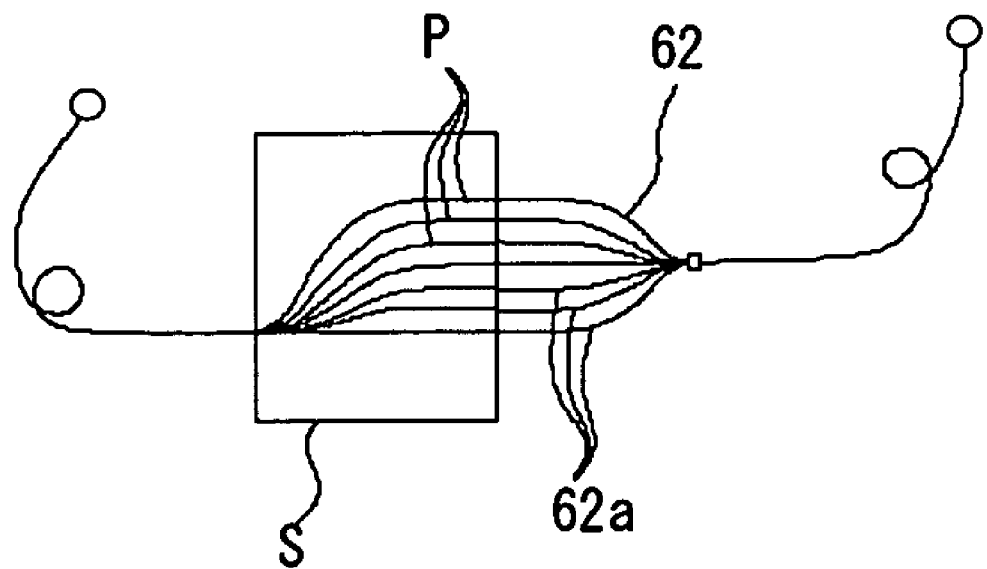

If correlation among a plurality of passes p is evaluated when the AWG is the measurement object S, an optical fiber 62 branched into a plurality of fibers is used as shown in FIG. 7B. By connecting branched fibers 62a of the optical fiber 62 to each pass p, a plurality of passes can be irradiated with light at a time to make measurements. In this case, for each branched fiber 62a of the optical fiber 62, its characteristics such as an optical path length and the like are preferably known, and calibration based on the characteristics is performed as required. If the optical path lengths of branched fibers 62a are equalized, measurements can be made with high accuracy without performing calibration.

The AWG is used not only for demultiplexing and multiplexing but also for waveform control of an ultashort optical pulse (see "Analysis of optical-signal processing using an arrayed-waveguide grating" Hirokazu Takenouchi, Hiroyuki Tsuda [online], [search: Dec. 2, 2003], Internet<URL:

http://www.opticsexpress.org/abstract.cfm?URI=OPEX-6-6-12 4>). If the AWG for use in waveform control is the measurement object S, evaluation of an output waveform over the entire channel when an input wavelength is changed, and the like, can be performed with the configuration shown in FIG. 7B.

Figure 8:
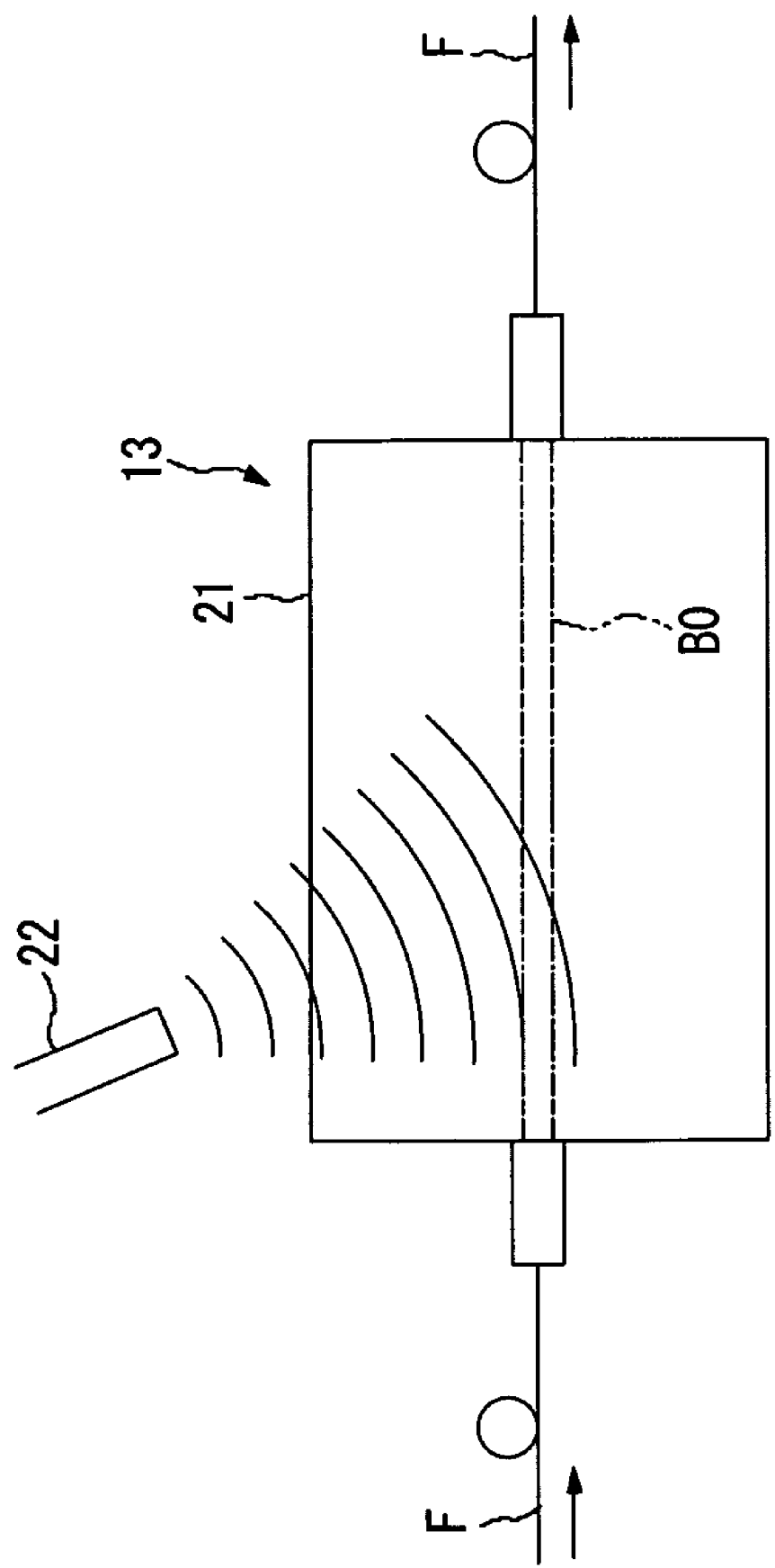
FIG. 8 shows still another form of the measurement object set in the detection apparatus.

This detection apparatus 10A detects a chemical reaction, a biological reaction, an effect of hyperthermia and the like, and therefore can be used as an apparatus for detecting heat generation associated with the reactions and effects of hyperthermia. In this case, the detection apparatus 10A detects a change in refractive index of a medium caused by an increase in temperature by heat generation during the reaction and an effect of hyperthermia associated with irradiation with an electromagnetic wave. As shown in FIG. 8, a chemical agent to be detected and the measurement object S to be evaluated such as cancer cells are put into a cell 21 such as a glass cell, for example, and set in the measurement object setting unit 13. Optical fibers F on the light incidence side and light emission side with respect to the measurement object setting unit 13 are provided such that zero-order light B0 is parallel beams in the sell 21.

If the measurement object S causes a chemical reaction or biological reaction, heat, which is emitted as the reaction of the measurement object S proceeds, causes an increase in temperature of a solvent or the like in the cell 21, and changes the refractive index. The change in refractive index causes a phase change dependent on the wavelength, which is thus evaluated (detected) in the detection apparatus 10A. If the measurement object S is cancer cells or the like, the measurement object setting unit 13 comprises a heating unit 22 irradiating the cell 21 with an electromagnetic wave or the like for heating the measurement object S. An electromagnetic wave or the like is applied by the heating unit 22, whereby the temperature of the measurement object S increases and the refractive index changes. Detection apparatus 10A detects the change in refractive index as a phase change in propagated light (zero-order light B0) and evaluates the same.

In this way, a change in refractive index of the measurement object S can be detected by an increase in temperature associated with a chemical reaction, a biological reaction, an effect of hyperthermia and the like, and chemical and biological reactions and an effect of hyperthermia can be correctly evaluated without influences of heat generation by light for monitoring, and the like, as were previously seen.

This detection apparatus 10A can make optical path length measurements in optical fibers and the like. In this case, in optical fibers as the measurement object S, measurements similar to those described above are made not with chromatic dispersion but with the optical path length of optical fibers. For this purpose, it is necessary that chromatic dispersion of the measurement object S should be negligible. Thus, in the detection apparatus 10A, an adjustment should be made so that the path of zero-order light B0 has an optical path length equal to that of the path of first-order light B1 before the measurement object S is set. The measurement object S is set in the measurement object setting unit 13, the wavelength is swept in a predetermined range to measure a phase. An optical path length L can be determined from an amount of phase change ($\Delta\Phi$) in sweep wavelength range.

$$L = c\Delta\phi/2\pi(\nu_{max} - \nu_{min})$$ [Formula 1]

L is an optical path length, c is a speed of light, and $\nu_{max}$ and $\nu_{min}$ are a maximum value and a minimum value corresponding to a measurement wavelength range, respectively.

Figure 9:
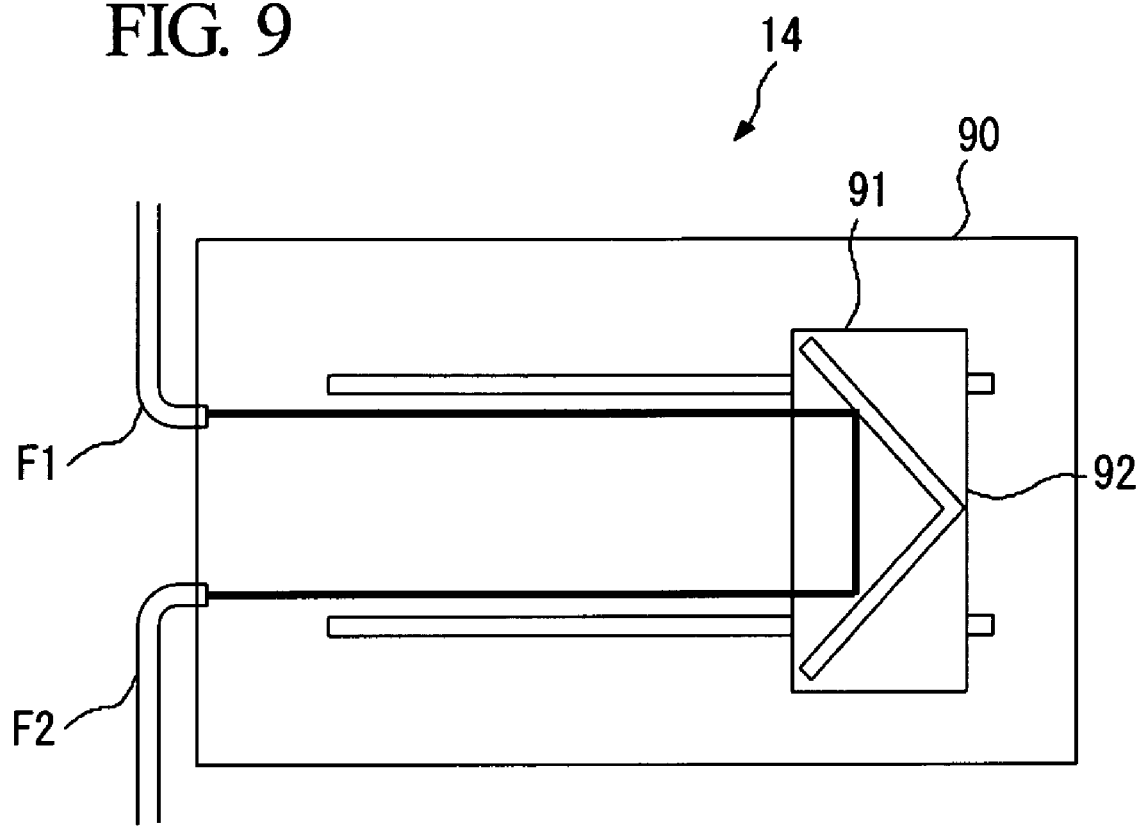
FIG. 9 shows one example of the configuration of an optical path difference controlling unit.

For the optical path difference controlling unit 14 for equalizing the optical path lengths of the path of zero-order light B0 and the path of first-order light B1 as described above, specifically the following configuration may be employed. First, by appropriately exchanging, adding and removing batch code type optical fibers having both ends connected by connectors, the optical path length is made variable, whereby the optical path difference controlling unit 14 can be formed. Furthermore, as shown in FIG. 9, a stage 91 is provided movably in one direction on a base 90, and a retro reflector 92 having an approximately V-shaped cross unit is provided on the stage 91. An optical fiber F1 irradiating first-order light B1 to the retro reflector 92, and an optical fiber F2 receiving light reflected at the retro reflector 92 and sending the light to the beam coupler 15 are fixed on the base 90. As a result, the stage 91 can be moved to adjust distances between the light emission and incidence ends of the optical fibers F1, F2 and the retro reflector 92. By providing such an optical path difference controlling unit 14, the optical path lengths of the path of zero-order light B0 and the path of first-order light B1 can be equalized. For this purpose, the wavelength of probe light is swept while a phase change is monitored as a function of the wavelength of probe light, the optical path length of the path on first-order light B1 side is adjusted by the optical path difference controlling unit 14 so that an amount of phase change is minimized. In this way, a phase change linearly dependent on the frequency can be removed, and only a term nonlinearly dependent on the frequency as a source of chromatic dispersion can be extracted. The detection apparatus 10A is designed so that chromatic dispersion of all parts including optical fibers in the detection apparatus 10A except for the measurement object S is reduced to 1/10 or less of chromatic dispersion of the measurement object S, whereby only chromatic dispersion of the measurement object S can be measured with high accuracy.

Second Embodiment

The second embodiment according to the present invention will now be described. In the first embodiment described above, an AC electric signal for monitoring from the frequency shifter 12 is determined to be a phase reference signal, and a relative phase of a probe signal is detected, but in the second embodiment described below, probe light ($E_{prob}$) for measurement of chromatic dispersion and reference light ($E_{ref}$) having different wavelengths are used. Since the detection apparatus 10A described in the above first embodiment and a detection apparatus 10B in the second embodiment described below have common basic apparatus components, common components are given by the same symbols and descriptions thereof are omitted in the following description.

Figure 10:
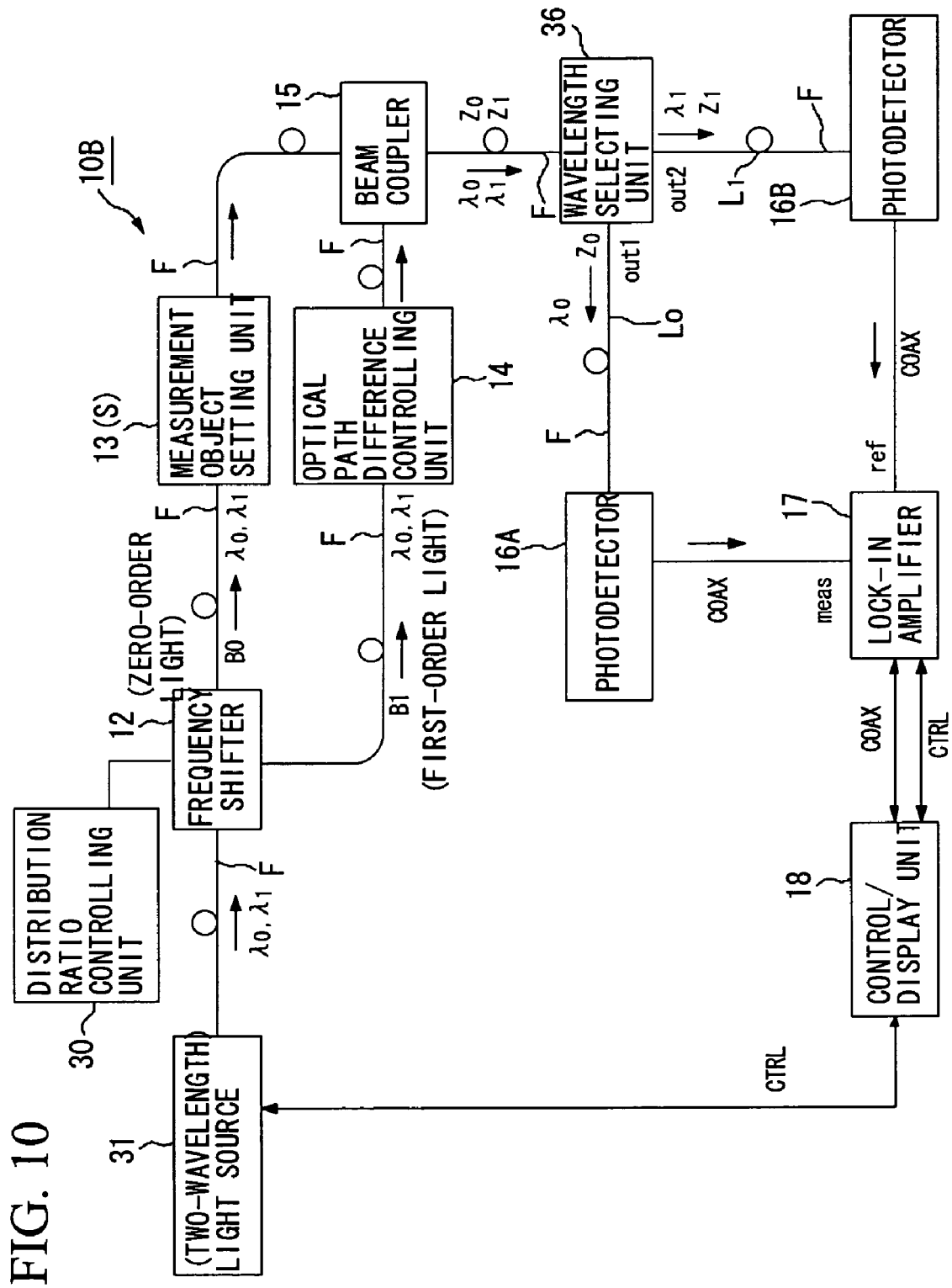
FIG. 10 shows the configuration of the detection apparatus in the second embodiment.
Figure 11:
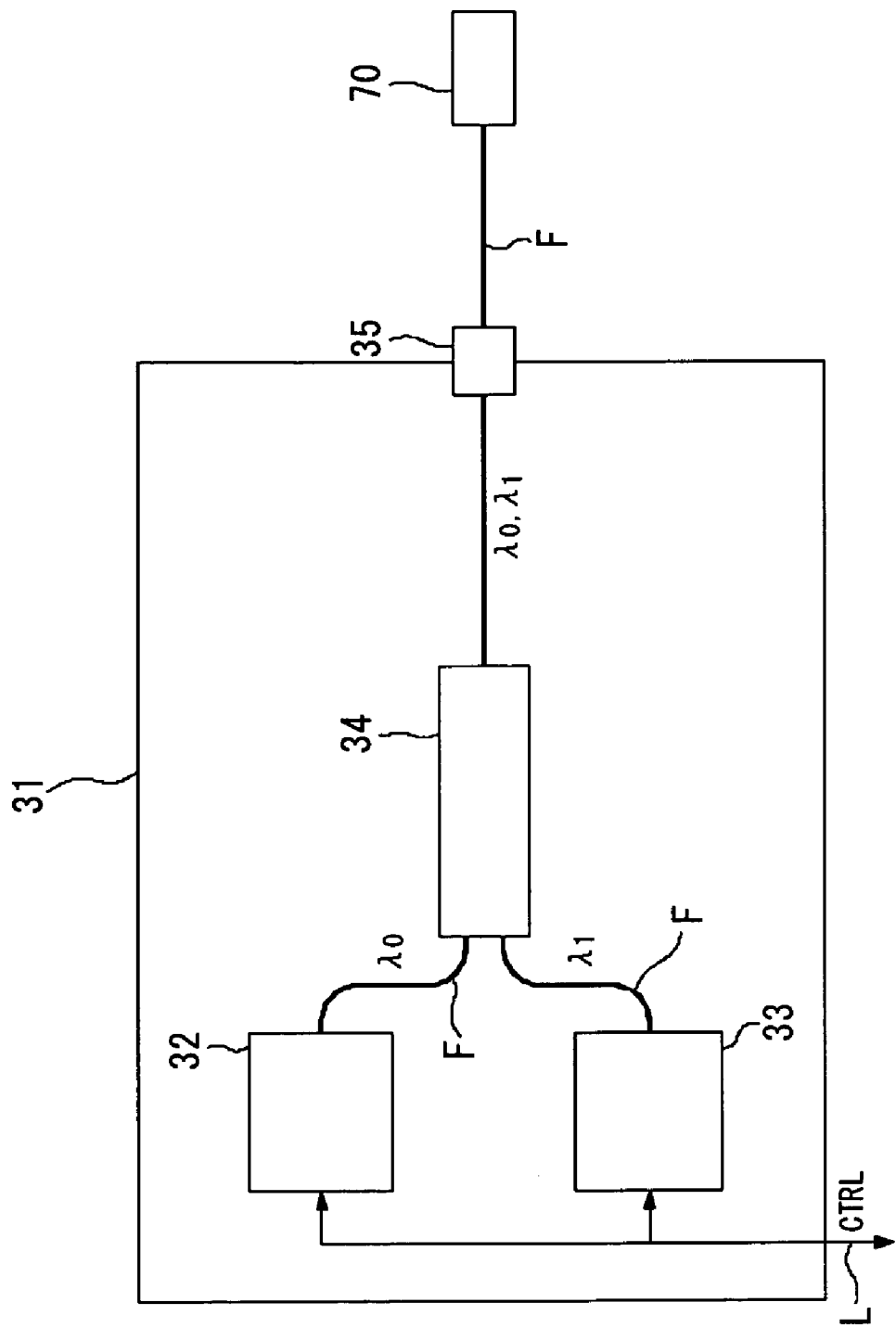
FIG. 11 shows the configuration of a light source.

For a light source 31 of the detection apparatus 10B shown in FIG. 10, a light source capable of producing light having two wavelengths $\lambda_0$ and $\lambda_1$ is used. As shown in FIG. 11, the light source 31 comprises a first light source 32 emitting light having a wavelength (first wavelength) $\lambda_0$ and a second light source 33 emitting light having a wavelength (second wavelength) $\lambda_1$, a coupling unit 34 coupling light having wavelengths $\lambda_0$ and $\lambda_1$ emitted from the first light source 32 and the second light source 33, and a connector 35. If the detection apparatus 10B is used in a free space system, optical fibers F and a beam collimator 70 are connected to the apparatus. Each of the first light source 32 and the second light source 33 has performance similar to that of a tunable laser light source of single mode oscillation used as the light source 11 in the detection apparatus 10A of the first embodiment described above. The first light source 32 and the second light source 33 are set so that the wavelength, wavelength sweep conditions, the optical intensity and the like can be controlled from outside, and the oscillation wavelength, wavelength sweep conditions, the output light power and the like can be monitored from outside. In the description below, light having a wavelength $\lambda_0$ is reference light and light having a wavelength $\lambda_1$ is probe light for detection of chromatic dispersion. The variable range and oscillation line width of wavelengths of reference light and probe light are same as those in the first embodiment described above.

Figure 12:
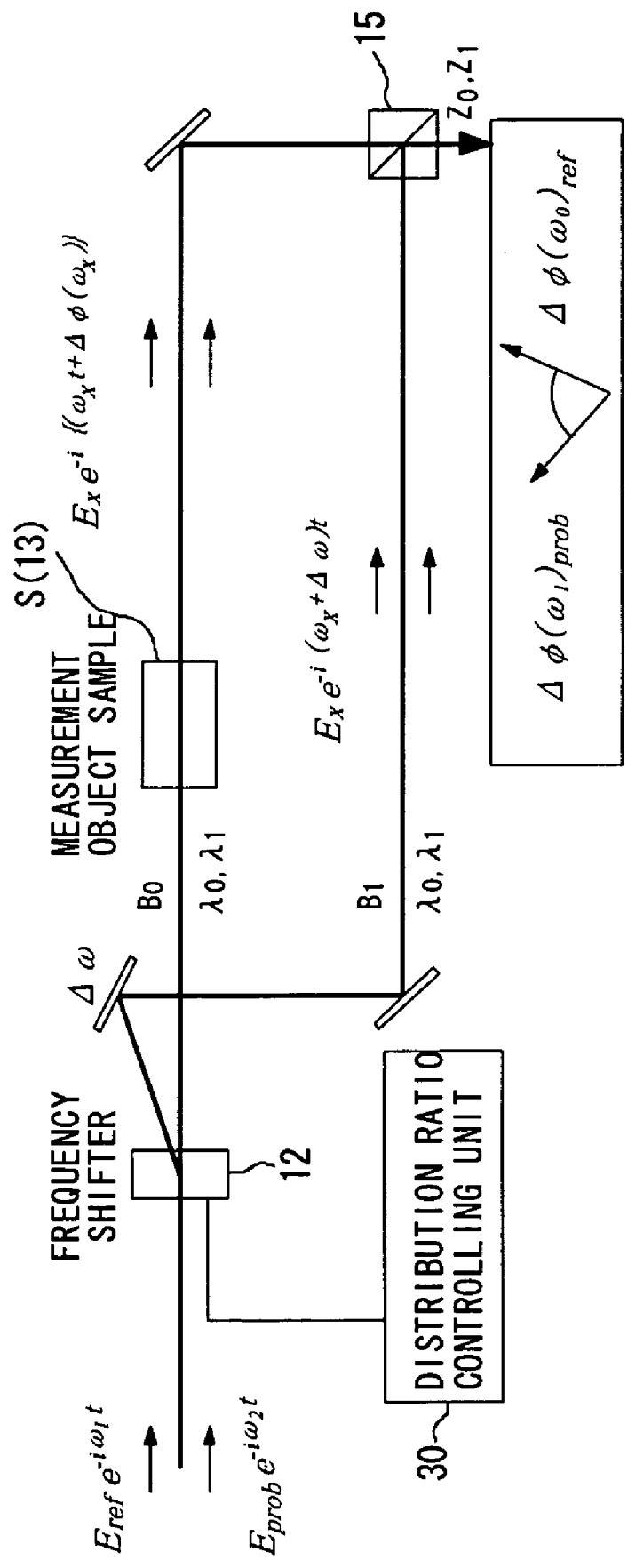
FIG. 12 shows a propagation form of light when two wavelengths are used.

As shown in FIG. 12, reference light and probe light emitted from the light source 31 are introduced into the frequency shifter 12 through optical fibers F. From the frequency shifter 12, zero-order light B0 having a first frequency, not shifted in frequency, and first-order light B1 shifted in frequency to have a second frequency are emitted for each of reference light having a wavelength $\lambda_0$ and probe light having a wavelength $\lambda_1$. At this time, for zero-order light B0 and first-order light B1 emitted from the frequency shifter 12 for each of reference light having a wavelength $\lambda_0$ and probe light having a wavelength $\lambda_1$, the distribution ratio can be controlled by a distribution ratio controlling unit 30 as in the case of the first embodiment described above. The amount of frequency shift of first-order light B1 is, for example, 80 MHz as in the case of first embodiment described above, for both wavelengths $\lambda_0$ and $\lambda_1$. In this embodiment, the frequency shifter 12 does not output an AC electric signal for monitoring.

Zero-order light B0 having wavelengths $\lambda_0$ and $\lambda_1$ as first probe light and first reference light enters the measurement object setting unit 13 as probe light through optical fibers F. First-order light B1 having wavelengths $\lambda_0$ and $\lambda_1$ as second probe light and second reference light enters the optical path difference controlling unit 14 as reference light through optical fibers F. Zero-order light B0 and first-order light B1 emitted from the measurement object setting unit 13 and the optical path difference controlling unit 14 are coupled together by the beam coupler 15 to form into superimposed light $Z_0$ and $Z_1$ having wavelengths $\lambda_0$ and $\lambda_1$, which are then introduced into one optical fiber F. As a result, a beat is produced in each of superimposed light $Z_0$ (probe light and reference light) having a wavelength $\lambda_0$ and superimposed light $Z_1$ (probe light and reference light) having a wavelength $\lambda_1$. The beat frequencies of superimposed light $Z_0$ and $Z_1$ having wavelengths $\lambda_0$ and $\lambda_1$ each equals a frequency (80 MHz) associated with an amount of frequency shifted in the frequency shifter 12, but their phases are different according to their respective wavelengths, reflecting chromatic dispersion of the measurement object S.

Figure 13:
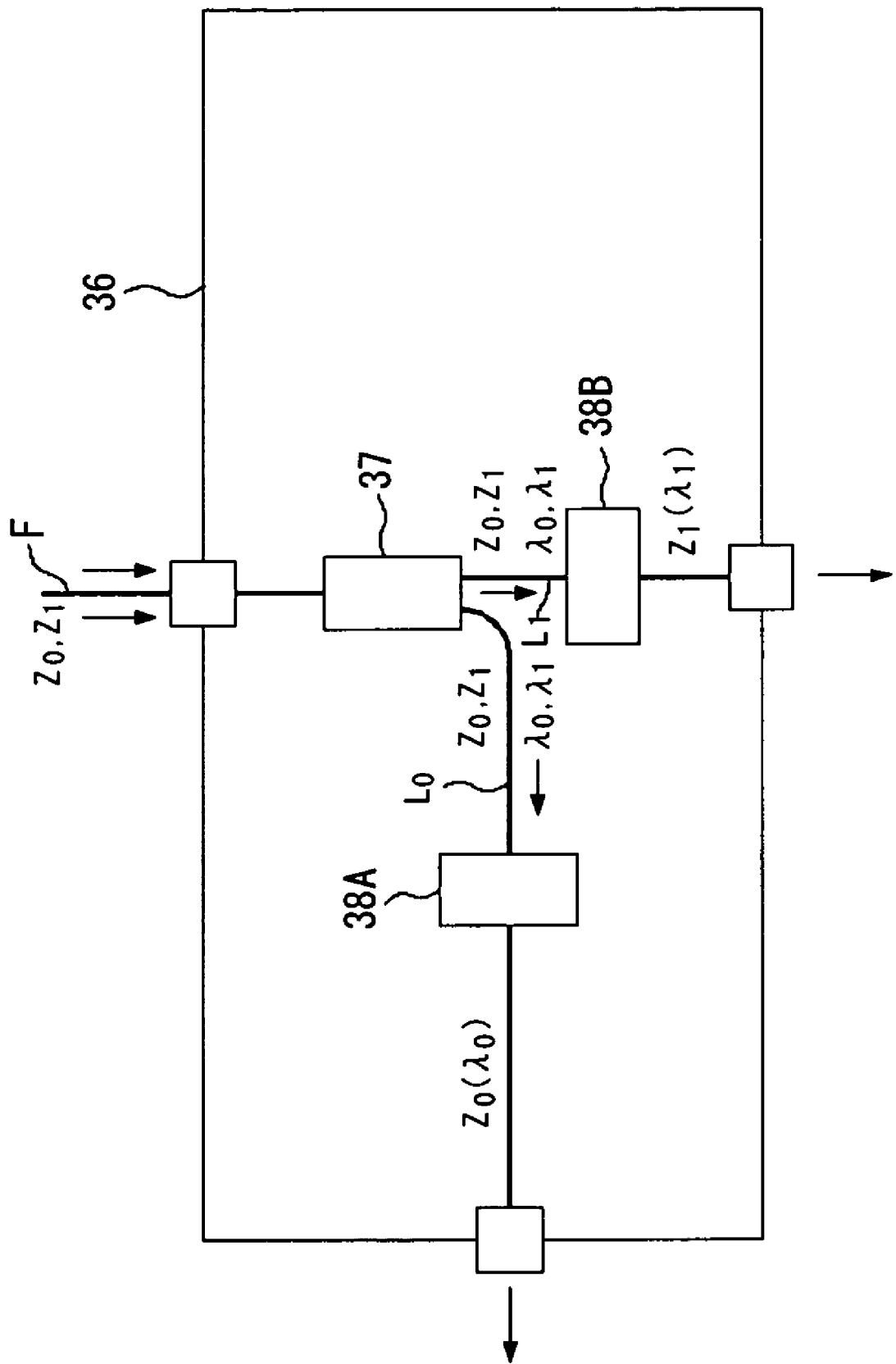
FIG. 13 shows one example of a wavelength selecting unit.

A wavelength selecting unit 36 is provided on the rear side of the beam coupler 15. The wavelength selecting unit 36 separates superimposed light $Z_0$ and $Z_1$ having wavelengths $\lambda_0$ and $\lambda_1$ according to the wavelength. FIG. 13 shows an example of configuration of the wavelength selecting unit 36. The wavelength selecting unit 36 has a configuration in which the optical fiber F, through which superimposed light $Z_0$ and $Z_1$ having wavelengths $\lambda_0$ and $\lambda_1$ are propagated, is branched into two lines by an optical fiber branching unit 37, and a tunable filter (first filter) 38A is provided in a line L0 while a tunable filter (second filter) 38B is provided in a line L1. The tunable filter 38A of the line L0 takes out superimposed light $Z_0$ having a wavelength $\lambda_0$ as reference light, and the tunable filter 38B of the line L1 takes out superimposed light $Z_1$ having a wavelength $\lambda_1$ as probe light. Thus, in the wavelength selecting unit 36, superimposed light $Z_0$ having a wavelength $\lambda_0$ can be emitted from the line L0 and superimposed light $Z_1$ having a wavelength $\lambda_1$ can be emitted from the line L1. Given that the wavelength $\lambda_0$ of superimposed light $Z_0$ as reference light is 1500 nm, the wavelength $\lambda_1$ of probe light sweeps across a range of 1502 to 1600 nm, for example. Therefore, the tunable filter 38B must allow light in a band broad enough for sweeping the wavelength $\lambda_1$ of superimposed light $Z_1$ as probe light to pass therethrough. The tunable filter 38A must be a narrow-band filter allowing only light in a range within about ±500 pm around wavelength $\lambda_0$=1500 nm to pass therethrough. Since the wavelengths $\lambda_0$ and $\lambda_1$ and wavelength range of reference light and probe light change depending on the measurement object S, tunable filters 38A and 38B are each required to have wavelength variability.

Figure 14:
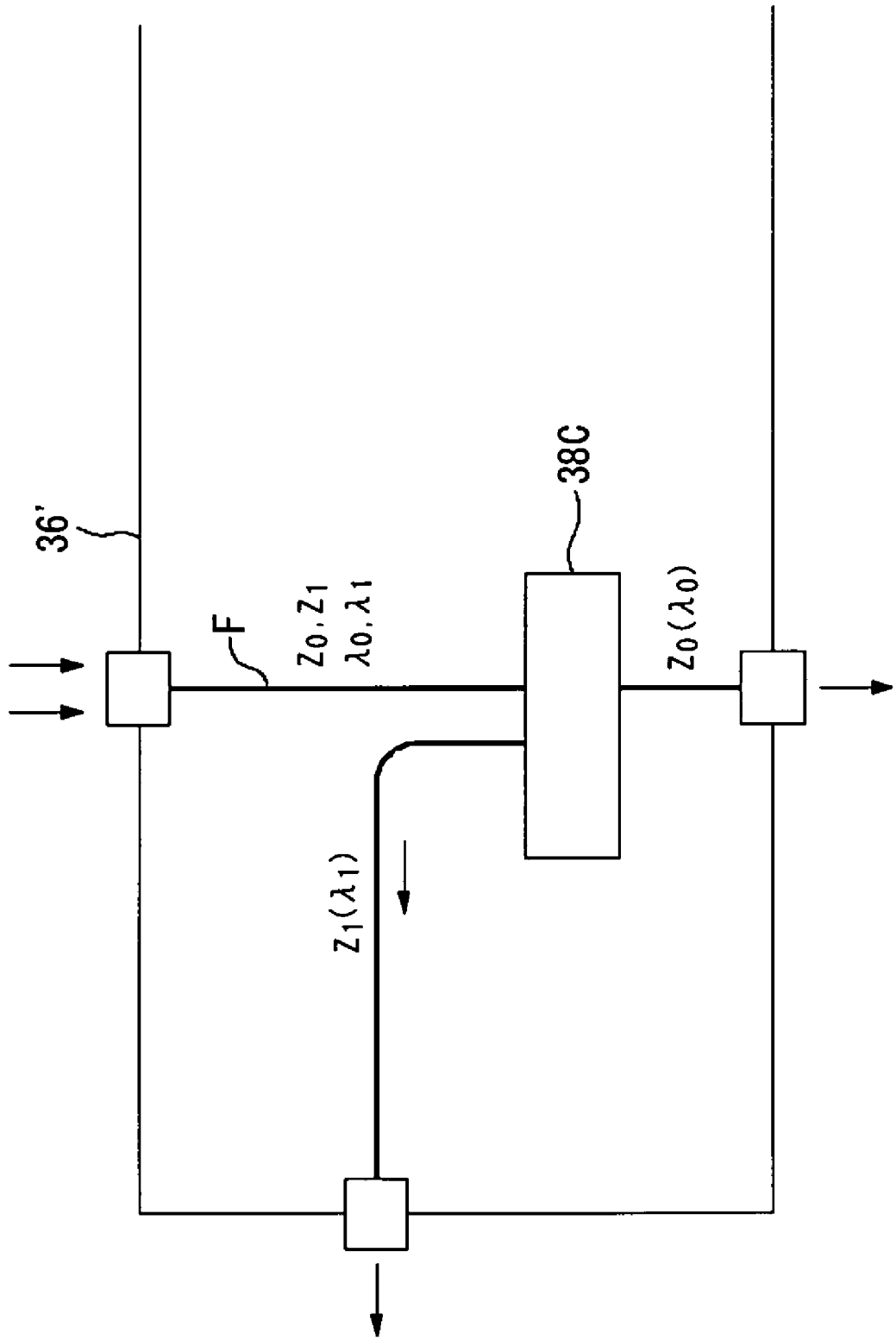
FIG. 14 shows another example of the wavelength selecting unit.

In addition to this configuration, there is a configuration which can function as the wavelength selecting unit 36. For example, light reflected from a tunable filter (filter) 38C contains components other than reference light as in a wavelength selecting unit 36' shown in FIG. 14. Moreover, the reflection band can be broad band of about 100 nm near the wavelength of reference light. Thus, a function equivalent to that of the wavelength selecting unit 36 of FIG. 13 can be realized by using light reflected from the tunable filter 38C as probe light without using the optical fiber branching unit 37 and tunable filters 38A and 38B as shown in FIG. 14.

As shown in FIG. 10, on the rear side of the wavelength selecting unit 36 (including unit 36'), a photodetector (first photoelectric element, first diode) 16A is provided in the line L0, and a photodetector (second photoelectric element, second photodiode) 16B is provided in the line L1. Superimposed light $Z_0$ and $Z_1$ separated according to the wavelength by the wavelength selecting unit 36 passes through the optical fiber F, and enters the photodetector 16A and the photodetector 16B. Photodetectors 16A and 16B output electric signals matching the intensity of incident light. The photodetector 16A outputs an electric signal matching a beat of superimposed light $Z_0$ having a wavelength $\lambda_0$, and the electric signal is input to the lock-in amplifier 17 as a phase reference electric signal. The photodetector 16B outputs an electric signal matching a beat of superimposed light $Z_1$ having a wavelength $\lambda_1$, and the electric signal is input to the lock-in amplifier 17 as a probe signal.

In the lock-in amplifier 17, a relative phase of the probe signal with respect to the phase reference signal is detected from the electric signal from the photodetector 16A as the phase reference electric signal and the electric signal from the photodetector 16B as the probe signal. Thus, the relative phase of the probe signal, i.e. a change in phase of zero-order light B0 resulting from passage through the measurement object S can be obtained, and chromatic dispersion of the measurement object S can be measured and displayed on the control/display unit 18. In this way, in the detection apparatus 10B, a wavelength of reference light is fixed, and on the basis of a beat phase at the wavelength, a beat phase of probe light sweeping the wavelength is measured, whereby chromatic dispersion of the measurement object S can be known.

In the detection apparatus 10A shown in the first embodiment described above, an AC electric signal in the frequency shifter 12 is taken out as a phase reference signal. However, in this way of taking out the phase reference, phase fluctuations resulting from vibrations and the like in the detection apparatus 10A cannot be removed, phase fluctuations of a produced beam are influenced. That is, the phase is not stably measured, and errors caused by phase fluctuations may influence measurement accuracy in the detection apparatus 10A depending on required measurement accuracy. In contrast to this, in the detection apparatus 10B of this embodiment, light having mutually different wavelengths $\lambda_0$ and $\lambda_1$ is used as reference light and probe light. Reference light and probe light pass through the same path, and therefore undergo common phase fluctuations. Thus, most of errors by phase fluctuations can be eliminated by offsetting phase fluctuations. Remaining phase fluctuations are ascribable to a difference between wavelengths. For example, given that the wavelength of reference light is 1500 nm, the lower limit of a sweep range, and the wavelength of probe light is 1600 nm, the upper limit of the sweep range, a difference between the wavelengths is 100 nm. This accounts for 6.7% of the wavelength of reference light. Accordingly, compared with the detection apparatus 10A of the first embodiment described above, the detection apparatus 10B allows errors by phase fluctuations to be considerably reduced, thus making it possible to make measurements more accurately and much more stably.

Figure 15A:
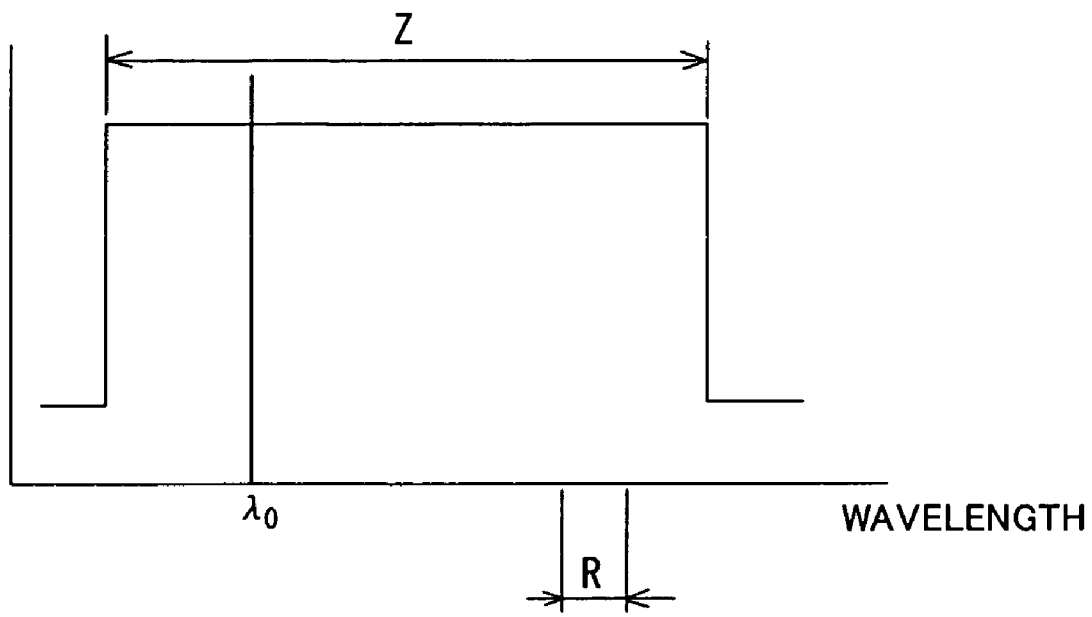
FIG. 15 shows a relation between probe light and a wavelength range in a reflective measurement object.

In this detection apparatus 10A, various measurement objects S can be measured in the forms shown in FIGS. 4 to 8. If a reflective measurement object S shown in FIG. 4C in the two-wavelength system detection apparatus 10B using light having two types of wavelengths, i.e. $\lambda_0$ and $\lambda_1$, there may be cases where measurements cannot be made depending on conditions (type, characteristics and the like of measurement object S). As shown in FIG. 15A, in the two-wavelength system detection apparatus 10B, the wavelength $\lambda_1$ of probe light sweeps a wavelength range R to be measured in the measurement object S. In contrast to this, the wavelength $\lambda_0$ of reference light is set at a predetermined space from the wavelength range R. In the case of a general reflective measurement object S, a wavelength range Z in which light is reflected at the measurement object S is a broad band including the wavelength range R in which probe light is swept and the wavelength $\lambda_0$ of reference light.

Figure 15B:
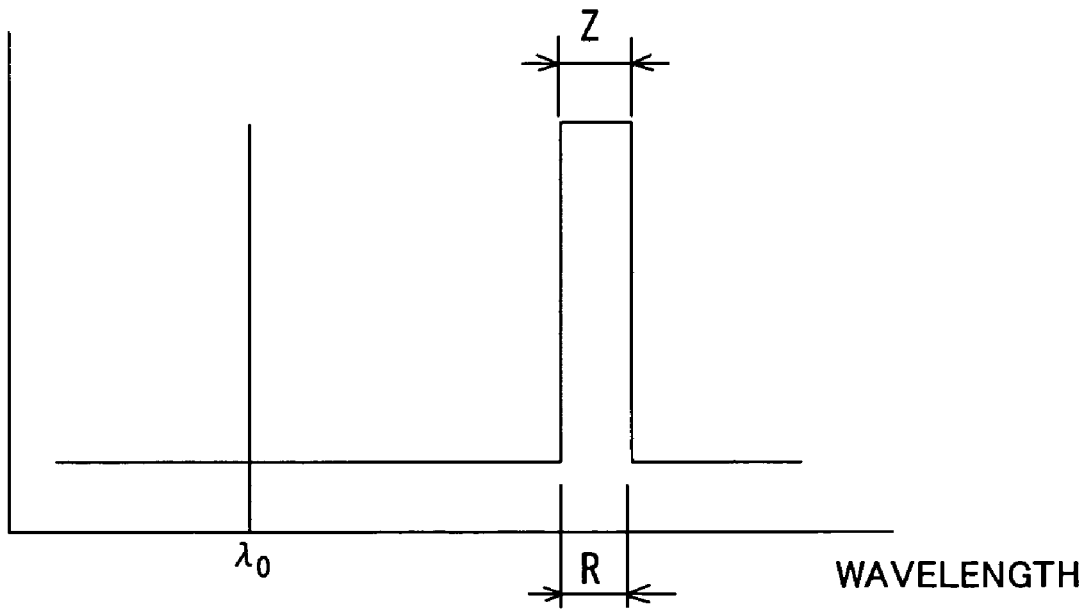

However, as shown in FIG. 15B, in the case of a measurement object S having characteristics of a narrow band in which the wavelength range Z in which light is reflected at the measurement object S does not include the wavelength range R in which probe light is swept and the wavelength $\lambda_0$ of reference light, reference light is not reflected at the measurement object S. As a result, only probe light reflected at the measurement object S can be obtained in a circulator 60, and thus phase detection itself cannot be performed. Such narrow band measurement objects S include, for example, an FBG (Fiber Bragg Grating). The FBG has a configuration such that a diffraction grating is provided on a propagation path of the optical fiber (for example, see "Fiber Bragg Gratings for Optical Fibre Communications" M. N. Zervas, John Wiley & Sons, December, 2003, ISBN: 0471815004, or "OADM in Metro Access", Masayoshi Kagawa, Hiroyuki Tsukada and Masashi Yoneda, Furukawa Electric Bulletin, January, 2003, No. 111, pp. 56-61).

Figure 16:
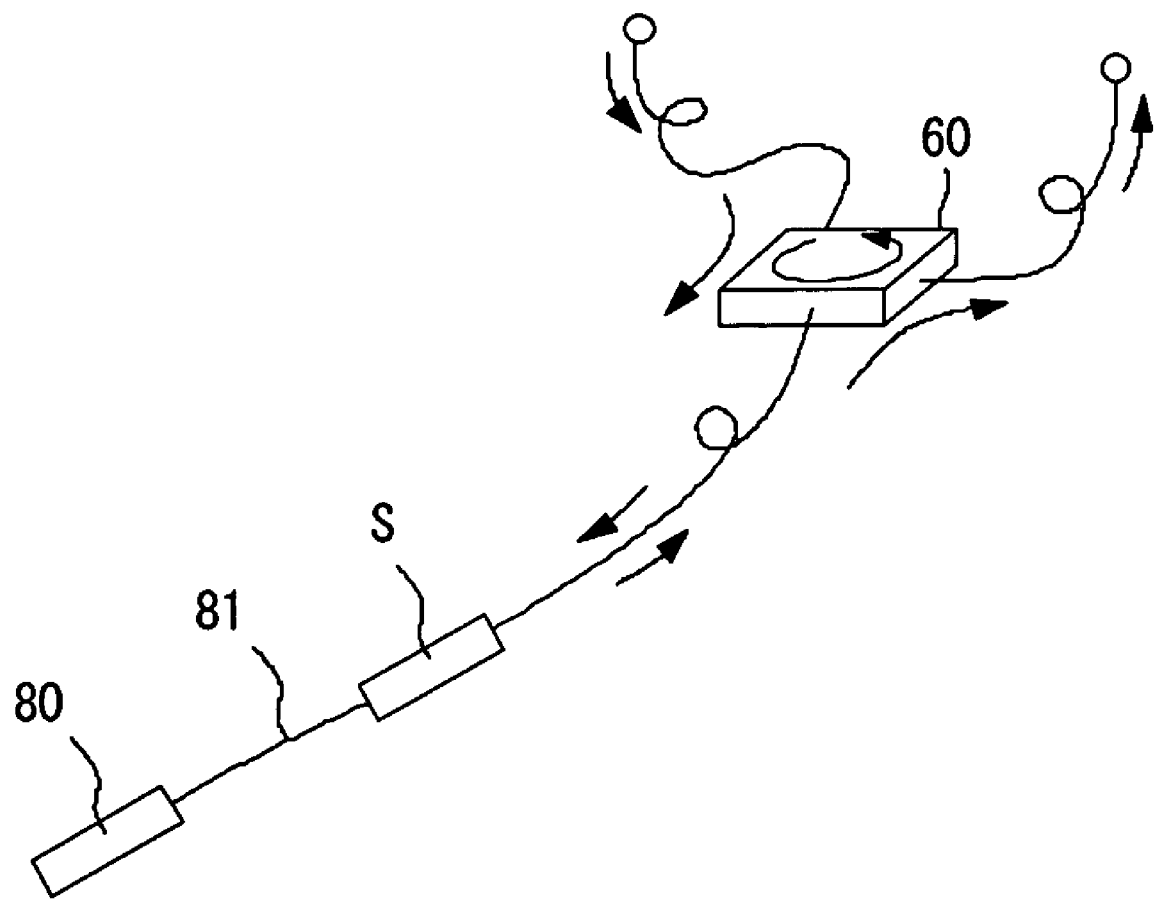
FIG. 16 shows the configuration of a measuring instrument in a narrow band reflective measurement object.

For measurement of the narrow band measurement object S, the configuration shown in FIG. 16 is effective. That is, a reflector (reflecting material) 80 reflecting the wavelength $\lambda_0$ of reference light is placed on the rear side of the measurement object S. Probe light is reflected at the measurement object S, but is not fully reflected, and part of probe light passes through the measurement object S and reaches the reflector 80. When probe light reaching the reflector 80 is reflected, probe light reflected at the measurement object S may be influenced, resulting in degradation in measurement accuracy, and therefore the reflector 80 preferably has characteristics such that light in the wavelength range R in which probe light is swept is not reflected. In the case of the FBG, if it is an FBG having a reflection peak at a wavelength of 1550 nm, the wavelength range R in which probe light is swept is 1545 to 1555 nm, the wavelength $\lambda_0$ of reference light is, for example, 1530 nm or so, and a difference in wavelength is very small, i.e. 15 nm or so. For the reflector 80 having characteristics such that reference light is reflected and light in the wavelength range R in which probe light is swept is not reflected in a very small difference in wavelength in this way, a reflector having narrow band reflection characteristics in itself is preferable and for example, the FBG is suitable.

In this case, the FBG as the measurement object S is connected to the FBG as the reflector 80 by optical fibers 81 having standard (known) dispersion. Thus, probe light is reflected at the FBG as the measurement object S to go back to the circulator 60, while reference light passes through the FBG as the measurement object S, and is reflected at the FBG as the reflector 80 to go back to the circulator 60.

By employing such a configuration, even a measurement object S having a narrow reflection band can be measured in the detection apparatus 10B.

Figure 17:
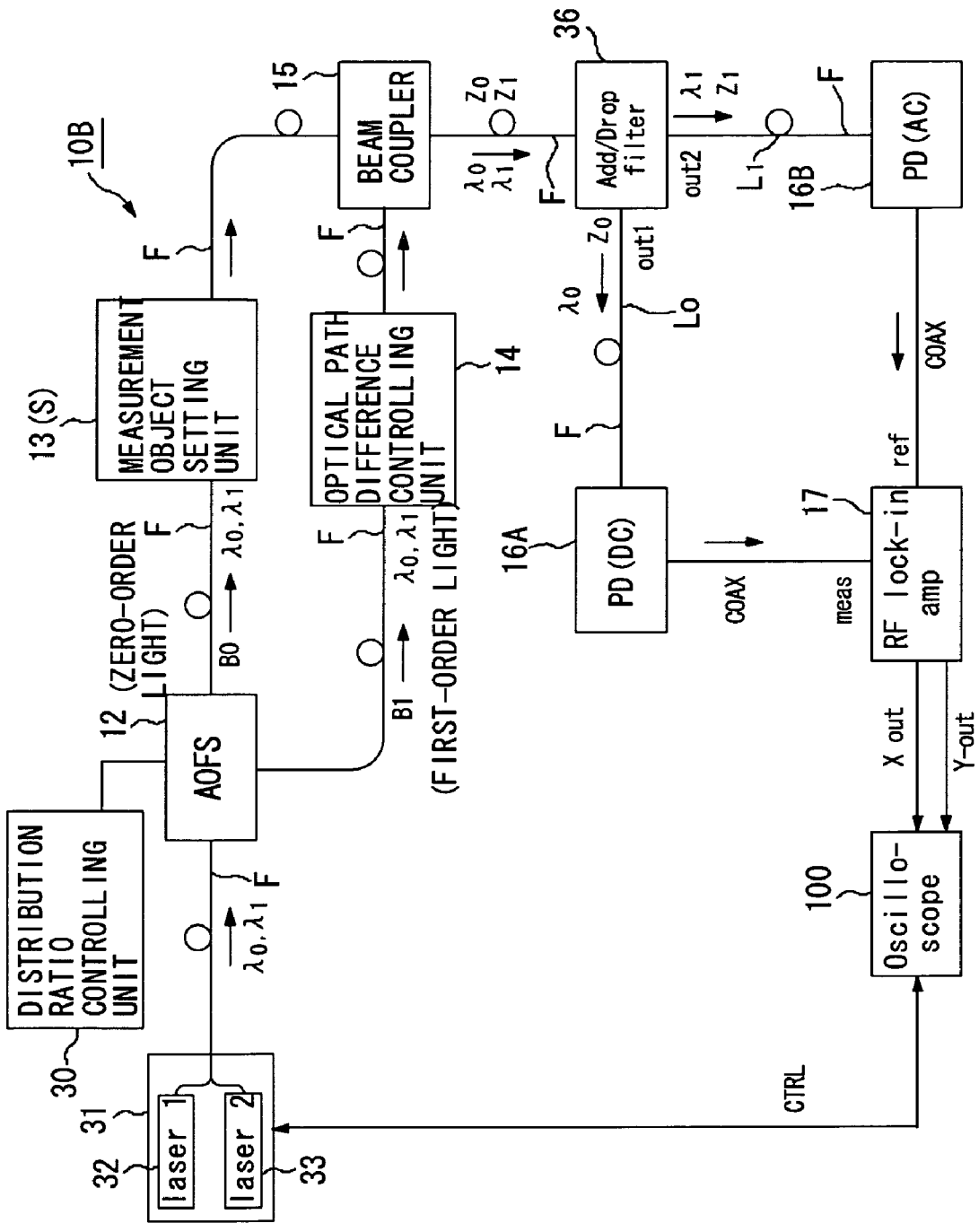
FIG. 17 shows the specific configuration of the detection apparatus.

FIG. 17 shows an example of specific configuration of the detection apparatus 10B described above. As shown in FIG. 17, in the specific configuration of the detection apparatus 10B, an AO frequency shifter (AOFS: Acousto-Optic Frequency Shifter) using acousto-optic (Acousto-Optic: AO) crystals is employed for the frequency shifter 12. The distribution ratio controlling unit 30 adjusting an AC electric signal applied to the frequency shifter 12 composed of the AO frequency shifter is provided, and the intensity of a beat produced between zero-order light B0 and first-order light B1 after addition of the measurement object S is optimized by the distribution ratio controlling unit 30, so that noises in the measurement result are minimized. For the wavelength selecting unit 36, an Add/Drop filter having a function of adding a new wavelength to a medium through which a plurality of wavelengths propagate (optical ADD function), and a function of taking out only single-wavelength from the medium (optical DROP function) is employed.

For photodetectors 16A and 16B detecting reference light having a wavelength $\lambda_0$ and probe light having a wavelength $\lambda_1$ and converting the light into electric signals, photodiodes (Photo Diode) are used. For the photodiode constituting the photodetector 16B on the side of reference light used as a reference in the lock-in amplifier 17, an AC (alternating-current) matching photodiode is preferably used. Zero-order light B0 passing through the measurement object setting unit 13 can be expressed by Formula 2 shown below, and first-order light B1 not passing through the measurement object setting unit 13 can be expressed by Formula 3. $E_x$ is an electric field of probe light or reference light (x represents probe light (prob) or reference light (ref)), e is a base of natural logarithm, i is an imaginary unit, and $\omega_x$ is an angular frequency of probe light or reference light, t is time, and $\Delta\phi$ is a phase difference produced by the measurement object S (this term includes chromatic dispersion).

$$E_0 = E_x e^{-i\{(\omega_x t + \Delta\phi(\omega_x))\}} \quad \text{[Formula 2]}$$

$$E_1 = E_x e^{-i(\omega_x + \Delta\omega)t} \quad \text{[Formula 3]}$$

A power P of superimposed light Z superimposed in the beam coupler 15 can be expressed as $P=(E_0+E_1)(E_0^*+E_1^*) = |E_0|^2+|E_1|^2+(E_0^*E_1^*)+(E_0E_1^*)$ (wherein E* represents a complex conjugate) using $E_0$ of Formula 2 and $E_1$ of Formula 3.

Terms of $(E_0^*E_1)$ and $(E_0E_1^*)$ are influenced by both zero-order light B0 and first-order light B1, i.e. involved in interference, but terms of $|E_0|^2$ and $|E_1|^2$ depend on respective paths of zero-order light B0 and first-order light B1, and therefore are not involved in interference, and so called direct-current components. By using an AC (alternating-current) matching photodiode for the photodiode constituting the photodetector 16B, an electric signal with the direct-current components cut therefrom can be output.

In the lock-in amplifier 17, an electric signal with direct-current components cut therefrom is used as a reference in this way, whereby a phase can be detected with a high-accuracy signal as a reference.

The measurement object S was actually measured using the specific configuration described above, and the results will now be described. The configuration used for the detection apparatus 10B is as follows: first light source 32: Model 6528 manufactured by NewFocus Co., Ltd.; second light source 33: Model 6428 manufactured by NewFocus Co., Ltd.; frequency shifter 12: AMF-100-10-1525 manufactured by Brimrose Co., Ltd.; photodetector 16A: Model 1811-FC (DC matching photodiode) manufactured by NewFocus Co., Ltd.; photodetector 16B: Model 1811-AC-FC (AC matching photodiode) manufactured by NewFocus Co., Ltd.; lock-in amplifier 17: SR 844 (operation conditions: time constant 0.3 ms or smaller, X-Y or R-theta mode) manufactured by Research Systems Co., Ltd.; and control/display unit 18: oscilloscope Model TS-8500 manufactured by Iwatsu Co., Ltd.

The measurement object S was an FBG having a reflection peak at a wavelength of 1550 nm and used as an optical filter for a 10 Gbps wavelength multiple transmission system in the c-band. For this measurement object S, the wavelength range R in which probe light is swept was 1545 to 1555 nm, and this wavelength range R having a width of 10 nm was swept in one second. Reference light had a wavelength of 1530 nm. Using an oscilloscope and a PC as the control/display unit 18, visual information was displayed by the oscilloscope while output signals from the lock-in amplifier 17 were received at a rate of 60000 points (times) per second by the PC, and were output as a relation between the frequency and the phase and the reflection intensity.

Figure 18:
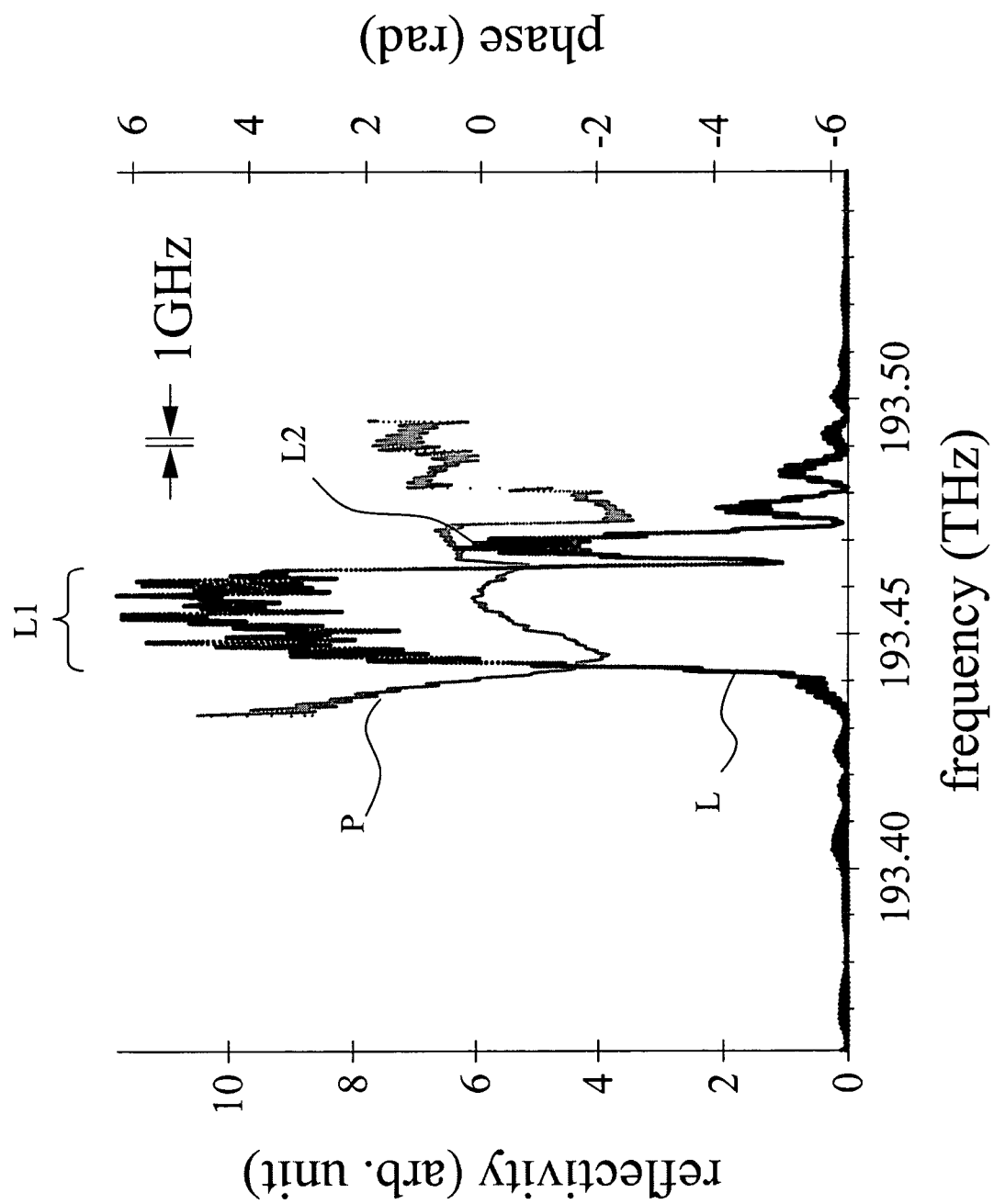
FIG. 18 shows obtained measurement results.

The output results are shown in FIG. 18. As shown in this figure, in a line L indicating a relation between the frequency and the reflection intensity, a peak of the reflection intensity having a spectrum width of about 20 to 30 GHz clearly appears (area of L1 in FIG. 18), and at the side of the peak, a fluctuation called a side lobe clearly appears (area of L2 in FIG. 18). In addition, on both the line L indicating a relation between the frequency and the reflection intensity and line P indicating a relation between the frequency and the phase, fluctuations appear at pitches of about 1 GHz, this fact clearly shows that measurements can be made with a resolution of about 1 GHz. Moreover, in the measurements, the wavelength range R having a width of 10 nm was swept in one second, and measurements could be carried out at a very high-speed and with a high-resolution. In addition, no limitation is imposed on the position and size of the wavelength range R swept, and even in the case of a broader wavelength range R, measurements can be made at a high speed and with high accuracy.

Third Embodiment

Figure 19:
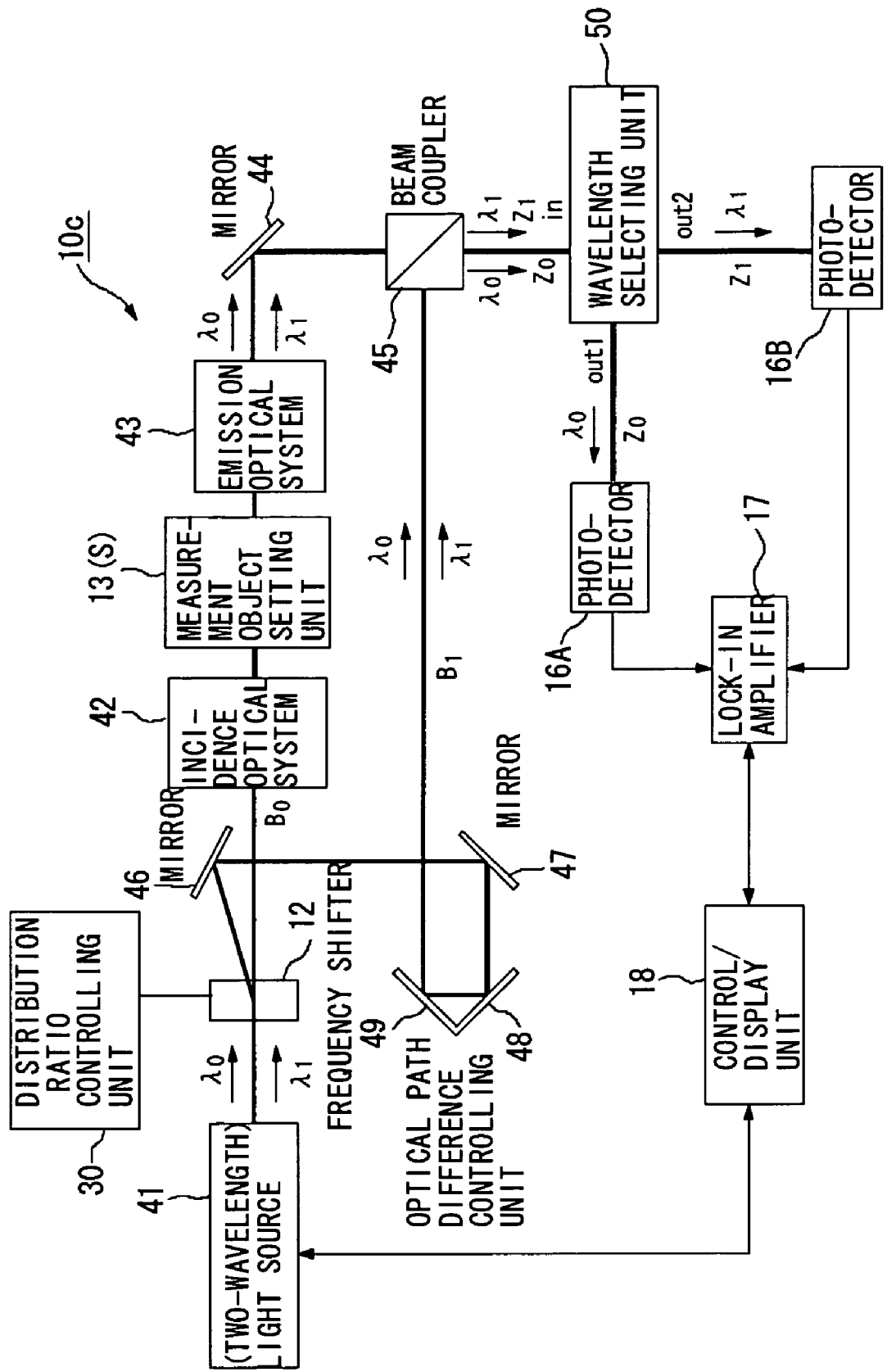
FIG. 19 shows the configuration of the detection apparatus in the third embodiment.

The third embodiment according to the present invention will now be described. Detection apparatuses 10A and 10B shown in the first and second embodiments described above each have a configuration in which light is propagated using optical fibers F, but a detection apparatus 10C in this embodiment has a configuration of a free space beam system using a mirror, a prism and the like. In the description below, components same as those of detection apparatuses 10A and 10B shown in the first and second embodiments described above are given by the same symbols, and descriptions thereof are omitted. Various kinds of alterative examples, application examples and the like can be similarly applied. In this case, as shown in FIG. 19, in the detection apparatus 10C, a configuration same as that of the light source 31 (see FIG. 11) shown in the second embodiment described above can be used as a light source 41, but in the case of the detection apparatus 10C constituted by the free space beam system, a beam collimator is provided at the leading end of the optical fiber F as an emission fiber, so that emitted light is parallel beams. From the light source 41, light having a wavelength $\lambda_0$ as reference light and light having a wavelength $\lambda_1$ as prove light are emitted. Reference light and probe light emitted from the light source 41 pass through a free space to the frequency shifter 12. From the frequency shifter 12, zero-order light B0 not shifted in frequency, and first-order light B1 shifted in frequency are emitted for each of reference light having a wavelength $\lambda_0$ and probe light having a wavelength $\lambda_1$. At this time, for zero-order light B0 and first-order B1 emitted from the frequency shifter 12 for each of reference light having a wavelength $\lambda_0$ and probe light having a wavelength $\lambda_1$, the distribution ratio can be controlled by a distribution ration controlling unit 30 as in the case of the first embodiment described above. The amount of shift in frequency of first-order light B1 is, for example, 80 MHz as in the case of first embodiment described above, for both wavelengths $\lambda_0$ and $\lambda_1$. In this embodiment, the frequency shifter 12 does not output an AC electric signal for monitoring.

Zero-order light B0 having wavelengths $\lambda_0$ and $\lambda_1$ passes through the free space and enters the measurement object setting unit 13 via an incidence optical system 42 as probe light. Zero-order light B0 exiting from the measurement object setting unit 13 passes through an emission optical system 43 and a mirror 44 to a cubic beam coupler 45. First-order light B1 having wavelengths $\lambda_0$ and $\lambda_1$ is emitted from the frequency shifter 12 at an angle different from that of zero-order light B0, and passes through mirrors 46 and 47 and retro reflector-type movable mirrors 48 and 49 function as optical path difference controlling unit to the beam coupler 45. Zero-order light B0 and first-order light B1 having wavelengths $\lambda_0$ and $\lambda_1$ are coupled together in the beam coupler 45 and emitted as superimposed light $Z_0$ and $Z_1$ having wavelengths $\lambda_0$ and $\lambda_1$. As a result, a beat is produced in each of superimposed light $Z_0$ (reference light) having a wavelength $\lambda_0$ and superimposed light $Z_1$ (probe light) having a wavelength $\lambda_1$ due to interference. The beat frequencies of superimposed light $Z_0$ and $Z_1$ having wavelengths $\lambda_0$ and $\lambda_1$ each equals a frequency (80 MHz) associated with an amount of frequency shifted in the frequency shifter 12, but their phases are different according to their respective wavelengths, reflecting chromatic dispersion of the measurement object S.

Figure 20:
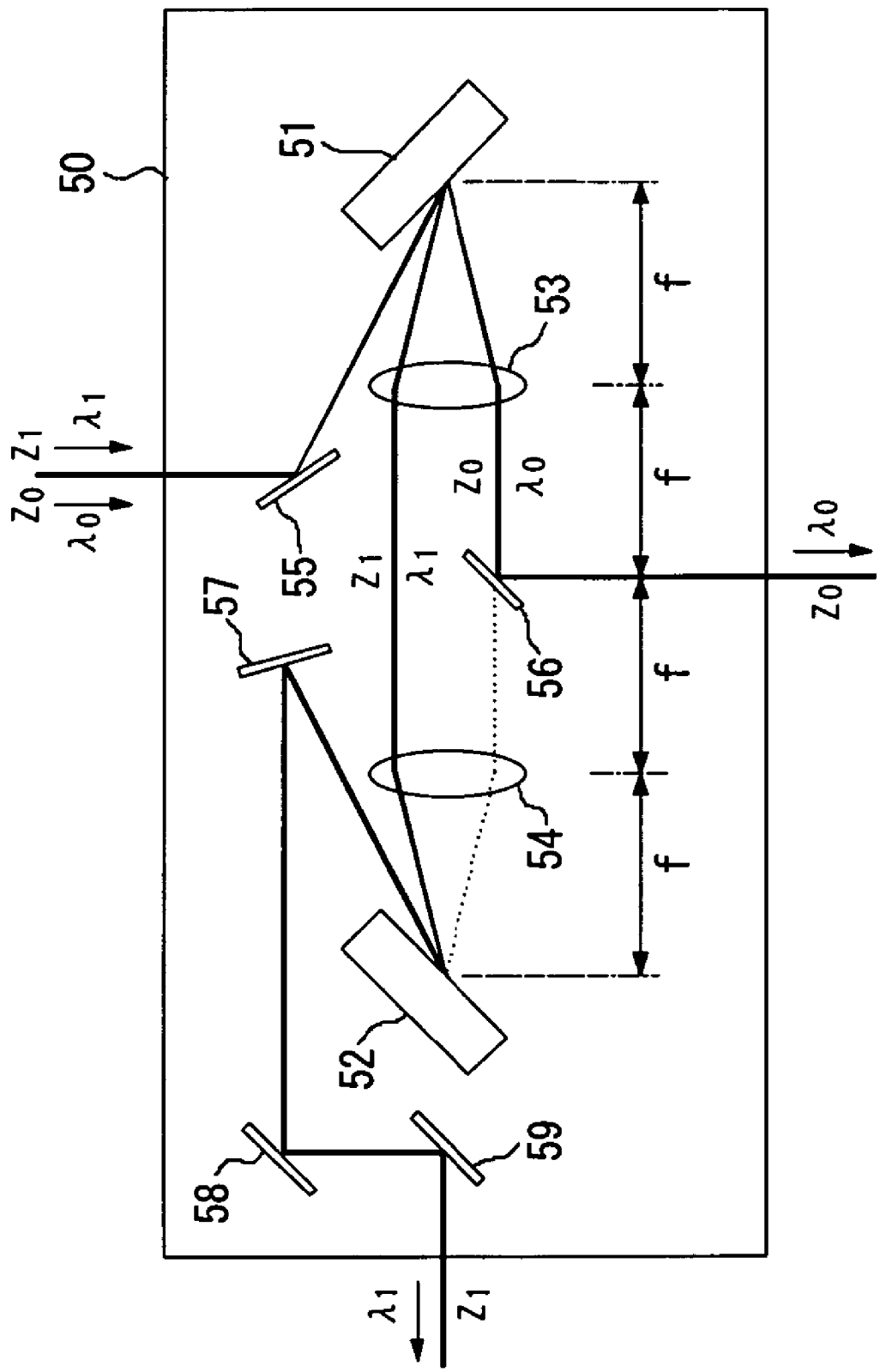
FIG. 20 shows the configuration of the wavelength selecting unit.

A wavelength selecting unit 50 is provided on the rear side of the beam coupler 45. The wavelength selecting unit 50 separates superimposed light $Z_0$ and $Z_1$ having wavelengths $\lambda_0$ and $\lambda_1$ according to the wavelength. FIG. 20 shows an example of configuration of the wavelength selecting unit 50. The wavelength selecting unit 50 has a configuration in which a pair of lenses 53 and 54 are placed between a pair of diffraction gratings 51 and 52. Lenses 53 and 54 are spherical lenses, and provided that focal distances of lenses 53 and 54 are each f, a distance between lenses 53 and 54 is 2f, and a distance between the lens 53 and the diffraction grating 51 and a distance between the lens 54 and the diffraction grating 52 are each f.

In this configuration, superimposed light $Z_0$ and $Z_1$ (parallel beams) having wavelengths $\lambda_0$ and $\lambda_1$ shine on the diffraction grating 51 at predetermined positions (on a prolongation of a line linking centers of lenses 53 and 54. Thus, superimposed light $Z_0$ and $Z_1$ having wavelengths $\lambda_0$ and $\lambda_1$, which have shined on the diffraction grating 51, each diffract at an angle matching the wavelength and travel to the lens (first lens) 53. That is, the incidence position in the lens 53 varies depending on the wavelengths of superimposed light $Z_0$ and $Z_1$. Superimposed light $Z_0$ having a wavelength $\lambda_0$ and superimposed light $Z_1$ having a wavelength $\lambda_1$, which have diffracted at the diffraction grating 51, form into mutually separate parallel beams through the lens 53. A mirror (first optical element) 56 for taking out superimposed light $Z_0$ having a wavelength $\lambda_0$, fixed to be reference light, is provided between lenses 53 and 54, whereby superimposed light $Z_0$ having a wavelength $\lambda_0$ is emitted through the mirror 56 to the photodetector 16A. Superimposed light $Z_1$ having wavelength $\lambda_1$ passes through the lens (second lens) 54, is collected on the diffraction grating (second diffraction grating) 52, and diffracts again at a predetermined angle matching the wavelength. At this time, the wavelength $\lambda_1$ of superimposed light $Z_1$ is variable, but light is diffracted and collected by a pair of diffraction gratings 51 and 52, and therefore superimposed light $Z_1$ is emitted from the diffraction grating 52 to outside as parallel beams traveling in the same direction. Superimposed light $Z_1$ having a wavelength $\lambda_1$, emitted to outside, is taken out by a mirror (second optical element) 57, and passes through mirrors 58 and 59 to the photodetector 16B. The optical system having such a configuration can separate light having different wavelengths for beams propagating through a free space, and can easily take out each light after separation as parallel beams.

In this way, reference light and probe light are separated according to a difference in wavelength in the wavelength selecting unit 50, and are made to collectively enter photodetectors 16A and 16B. Then, photodetectors 16A and 16B output electric signals matching the intensity of incident light and based on the electric signals, the lock-in amplifier 17 detects a phase of a probe signal relative to a phase reference signal from the electric signal from the photodetector 16A as a phase reference electric signal and the electric signal from the photodetector 16B as a probe signal. Thus, a relative phase of the probe signal, i.e. a phase change of zero-order light B0 due to passage through the measurement object S can be obtained, and chromatic dispersion of the measurement object S can be measured, and displayed on the control/display unit 18.

In this way, in the detection apparatus 10C having a free space beam system, en effect same as those of the first and second embodiments described above can be obtained. By employing a configuration having a free space system, chromatic dispersion can be measured even with light in a wavelength range not allowing optical fibers F to be used, e.g. light having a wavelength of about 500 nm, in the detection apparatus 10C.

(Specific Example and Application Example of Control/Display Unit 18)

In the embodiments described above, a PC is generally used for the control/display unit 18 as shown in FIG. 2 and in this case, an electric signal from the lock-in amplifier 17 is received via an AD converter (ADC), and a chromatic dispersion waveform is displayed on a display 18a in a φ-λ form as shown in FIG. 3. As another method, an electric signal output from the lock-in amplifier 17 can be displayed in an X-Y form on an oscilloscope 100 as shown in FIG. 17. This configuration allows a state of a phase to be directly recognized by visually perceiving rotation of an image of a circle displayed on the oscilloscope 100. Output display in the X-Y form on the oscilloscope 100 can be combined without put on the PC 18. For example, in the early evaluation stage of the measurement object S, output display on the oscilloscope 100 is used to make rough evaluations intuitively and based on the evaluations, characteristics of the measurement object S are adjusted, and soon, and in the stage where characteristics of the measurement object S are stabilized to some extent, e.g. in the mass production stage, outputs can be produced with numerical values on the PC 18.

In the embodiments described above, zero-order light B0 is made to enter the measurement object S, while first-order light B1 is not made to enter the measurement object S. However, the apparatus can have configuration such that zero-order light B0 does not enter the measurement object S, while first-order light B1 is made to enter the measurement object S. Usually, zero-order light B0 has a higher intensity than first-order light B1, and may cause a loss by reflection and absorption when transmitting from the measurement object S, and therefore in each embodiment described above, the configuration such that zero-order light B0 is made to enter the measurement object S is employed. If the frequency shifter 12 is constituted by commercially available acousto-optic crystals and an RF oscillator, the intensities of zero-order light B0 and first-order light B1 may be adjusted with the RF intensity being variable. In this case, the intensity ratio between zero-order light B0 and first-order light B1 may be reversed, and there may be cases where it is effective to make first-order light B1 enter the measurement object S. Thus, which light should be made to enter the measurement object S may be determined according to characteristics of the frequency shifter 12. The electric frequency band for photodetectors 16, 16A and 16B may be either a broad band higher than the beat frequency or a narrow band of about several MHzs around the beat frequency. If the intensity of fixed light is detected, and the measurement object S is adjusted so that transmitted light is maximized, the photodetector 16, 16A or 16B responding in a broad band from the DC to above the beat frequency may be selected, and if DC components and noises from frequencies other than the beat frequency should be removed, an photodetector responding only in a narrow band may be selected as the photodetector 16, 16A or 16B. In addition, configurations described in the above embodiments may be adopted or rejected, or changed to other configurations as appropriate without departing from the spirit of the present invention.

The invention claimed is:

1. A detection apparatus comprising:
a light source emitting probe light having a first wavelength and reference light having a second wavelength different from said first wavelength;
a frequency shifter branching said probe light into first probe light and second probe light, and said reference light into first reference light and second reference light, and shifting frequencies of said first probe light and said first reference light or frequencies of said second probe light and said second reference light;
an irradiation unit irradiating a measurement object with said first probe light and said first reference light;
a superimposition unit superimposing said first probe light and said first reference light applied to said measurement object by said irradiation unit on said second probe light and said second reference light; and
a phase detecting unit detecting a phase of a beat produced by superimposition of said first probe light on said second probe light on the basis of a beat produced by superimposition of said first reference light on said second reference light.

2. The detection apparatus according to claim 1, further comprising:
a wavelength selecting unit separating the beat produced by superimposition of said first probe light on said second probe light from the beat produced by superimposition of said first reference light on said second reference light based on a difference in wavelength between said first probe light and said second probe light and wavelength between said first reference light and said second reference light.

3. The detection apparatus according to claim 2, wherein said wavelength selecting unit comprises a first filter allowing light having said first wavelength to pass therethrough, and a second filter allowing light having said second wavelength to pass therethrough.

4. The detection apparatus according to claim 2, wherein said wavelength selecting unit comprises a filter allowing light having said first wavelength to pass therethrough and reflecting light having said second wavelength.

5. The detection apparatus according to claim 2, wherein said wavelength selecting unit comprises a diffraction grating diffracting said first probe light and said first reference light and said second probe light and said second reference light superimposed by said superimposition unit, at a predetermined angle matching the wavelength.

6. The detection apparatus according to claim 5, wherein said wavelength selecting unit further comprises:
- a first lens forming superimposed light of said first probe light and said second probe light diffracted by said diffraction grating and superimposed light of said first reference light and said second reference light diffracted by said diffraction grating into parallel beams;
- a first optical element taking out superimposed light of said first reference light and said second reference light passing through said first lens;
- a second lens provided in parallel with said first lens and retracting superimposed light of said first probe light and said second probe light passing through the first lens;
- a second diffraction grating diffracting superimposed light of said first probe light and said second probe light refracted by said second lens, at a predetermined angle matching the wavelength; and
- a second optical element taking out superimposed light of said first probe light and said second probe light diffracted by said second diffraction grating.

7. The detection apparatus according to claim 1, wherein said phase detecting unit comprises:
- a first photoelectric element converting energy of superimposed light of said first probe light and said second probe light into an electric signal and outputting the electric signal; and
- a second photoelectric element converting energy of superimposed light of said first reference light and said second reference light into an electric signal and outputting the electric signal,
- wherein said phase is detected based on the electric signal output from said first photoelectric element and the electric signal output from said second photoelectric element.

8. The detection apparatus according to claim 7, wherein said first photoelectric element and said second photoelectric element are photodiodes, and at least said photodiode constituting said second photoelectric element is an alternating-current matching type photodiode.

9. The detection apparatus according to claim 1, wherein said measurement object reflects only light in a specific wavelength range, and when the wavelength of said first probe light is within said wavelength range, and the wavelength of said first reference light is set to a wavelength outside said wavelength range, said irradiation unit comprises a reflection material reflecting said first reflection light before or after said measurement object in a direction in which said measurement object is irradiated with said first probe light and said first reference light.

10. The detection apparatus according to claim 9, wherein said reflection material reflects only light in a wavelength range including the wavelength of said first reference light and not including the wavelength range reflected by said measurement object.

11. The detection apparatus according to claim 1, further comprising a chromatic dispersion measuring unit measuring chromatic dispersion of said measurement object based on the phase of the beat produced by superimposition of said first probe light on said second probe light, detected by said phase detecting unit.

12. The detection apparatus according to claim 1, wherein a change in temperature of said measurement object is detected based on a change in phase of the beat produced by superimposition of said first probe light on said second probe light, detected by said phase detecting unit.

13. The detection apparatus according to claim 1, wherein an optical path length of said measurement object is measured based on a change in phase of the beat produced by superimposition of said first probe light on said second probe light, detected by said phase detecting unit.

14. The detection apparatus according to claim 1, further comprising a distribution ratio controlling unit adjusting a power of an alternating-current electric signal applied to said frequency shifter, and controlling a distribution ratio between said first probe light and said first reference light and a distribution ratio between said second probe light and said second reference light shifted in frequency by said frequency shifter.

15. The detection apparatus according to claim 1, further comprising: a reflector which reflects light in a wavelength range including the first wavelength of said reference light and not including a wavelength range in which light is reflected by said measurement object, wherein
- said measurement object reflects light in a wavelength range including the first wavelength of said probe light and not including the first wavelength of said reference light, and
- said reflector is placed before or after said measurement object in a direction in which said measurement object is irradiated with said probe light and said reference light.

16. The detection apparatus according to claim 15, wherein said reflector is an optical fiber grating and is connected to a rear side of said measurement object.

17. A detection apparatus comprising:
- a light source emitting probe light having a first wavelength and reference light having a second wavelength different from said first wavelength;
- a frequency shifter branching said probe light into first probe light having a first frequency and second probe light having a second frequency, and branching said reference light into first reference light having said first frequency and second reference light having said second frequency;
- an irradiation unit irradiating a measurement object with said first probe light and said first reference light;
- a photocoupler superimposing said first probe light and said first reference light, exiting from said irradiation unit, on said second probe light and said second reference light;
- a filter branching light exiting from said photocoupler into light having said first wavelength and light having said second wavelength;
- a first photodiode outputting an electric signal corresponding to light having said first wavelength, branched by said filter;

a second photodiode outputting an electric signal corresponding to light having said second wavelength, branched by said filter; and a lock-in amplifier measuring a change in electric signal output from said first photodiode on the basis of the electric signal output from said second photodiode.

18. The detection apparatus according to claim 17, wherein said second photodiode is an alternating-current matching type photodiode, capable of removing direct-current components.

19. The detection apparatus according to claim 17, further comprising a result outputting unit outputting measurement results as visual information based on an electric signal output from said lock-in amplifier.

20. The detection apparatus according to claim 19, wherein said result outputting unit comprises an oscilloscope capable of displaying said electric signal from said lock-in amplifier in an X-Y mode.

21. An optical path length measuring apparatus comprising:

a light source emitting probe light having a first wavelength and reference light having a second wavelength different from said first wavelength;

a frequency shifter branching said probe light into first probe light and second probe light, and said reference light into first reference light and second reference light, and shifting frequencies of said first probe light and said first reference light or said second probe light and said second reference light;

an irradiation unit irradiating a measurement object with said first probe light and said first reference light;

a superimposition unit superimposing said first probe light and said first reference light applied to said measurement object by said irradiation unit on said second probe light and said second reference light; and a phase detecting unit detecting a phase of a beat produced by superimposition of said first probe light and said second probe light on the basis of a beat produced by superimposition of said first reference light and said second reference light, wherein when the wavelength of said probe light emitted from said light source is swept, a change in phase of said beat is detected by said phase detecting unit to measure an optical path length of said measurement object.

22. A method for evaluating an optical member, the method comprising the steps of:

producing first probe light having a first frequency, first reference light having a second frequency different from said first frequency, second probe light having a frequency shifted from said first frequency by a predetermined amount, and second reference light having a frequency shifted from said second frequency by said predetermined amount;

irradiating an optical member with said first probe light and said first reference light;

superimposing said first probe light and said first reference light applied to said optical member on said second probe light and said second reference light;

detecting a phase of a beat produced by superimposition of said first probe light and said second probe light on the basis of a beat produced by superimposition of said first reference light and said second reference light; and measuring optical characteristics of said optical member based on the detected phase of said beat.

23. The method for evaluating an optical member according to claim 22, wherein in said step of measuring optical characteristics, chromatic dispersion of said optical member is measured.

24. The method for evaluating an optical member according to claim 22, wherein in said step of measuring optical characteristics, when the wavelengths of said first probe light and said second probe light are swept, a change in phase of said beat is detected to measure an optical path length of said measurement object.

25. The method for evaluating an optical member according to claim 22, wherein the absolute value of an amount of shift in frequency of said second probe light and said second reference light with respect to said first probe light and said first reference light is smaller than the absolute value of a difference in frequency between said first probe light and said first reference light.

26. The method for evaluating an optical member according to claim 25, wherein the absolute value of an amount of shift in frequency of said second probe light and said second reference light with respect to said first probe light and said first reference light is 30 to 200 MHz.

27. A method for detecting a change in temperature, the method comprising the steps of:

producing first probe light having a first frequency, first reference light having a second frequency different from said first frequency, second probe light having a frequency shifted from said first frequency by a predetermined amount, and second reference light having a frequency shifted from said second frequency by said predetermined amount;

irradiating an optical member with said first probe light and said first reference light;

superimposing said first probe light and said first reference light applied to said optical member on said second probe light and said second reference light;

detecting a phase of a beat produced by superimposition of said first probe light and said second probe light on the basis of a beat produced by superimposition of said first reference light and said second reference light; and detecting a change in temperature of a detection object based on the detected phase of said beat.

* * * * *